US005774064A

United States Patent [19]

Lambropoulos et al.

[11] Patent Number: 5,774,064

[45] Date of Patent: Jun. 30, 1998

[54] REMOTE CONTROL SYSTEM FOR DOOR LOCKS

[75] Inventors: George Lambropoulos, Grosse Pointe Woods; Robert A. Hair, Pontiac; Kenneth R. Pitera, Warren, all of Mich.

[73] Assignee: TRW Inc., Lyndhurst, Ohio

[21] Appl. No.: 751,588

[22] Filed: Nov. 18, 1996

Related U.S. Application Data

[63] Continuation of Ser. No. 419,447, Apr. 10, 1995, Pat. No. 5,619,191, which is a continuation of Ser. No. 133,744, Oct. 7, 1993, Pat. No. 5,406,274, which is a continuation of Ser. No. 767,034, Sep. 26, 1991, Pat. No. 5,252,966, which is a continuation of Ser. No. 336,841, Apr. 12, 1989, Pat. No. 5,109,221, which is a division of Ser. No. 262,206, Oct. 19, 1988, Pat. No. 4,881,148, which is a continuation of Ser. No. 52,469, May 21, 1987, abandoned.

[51] Int. Cl.[6] .......... H04Q 7/00

[52] U.S. Cl. .......... 340/825.69; 340/825.31; 340/825.22; 341/176

[58] Field of Search .......... 340/825.69, 825.31, 340/825.32, 825.49, 825.72, 825.63, 825.44, 825.3, 825.56, 426, 425.5, 825.22; 70/278, 256; 361/172; 307/10.2, 10.5; 455/129, 343, 38.3

[56] References Cited

U.S. PATENT DOCUMENTS

| | | |
|---|---|---|
| 4,004,228 | 1/1977 | Mullet . |
| 4,031,434 | 6/1977 | Perron et al. . |
| 4,143,368 | 3/1979 | Route et al. . |
| 4,194,153 | 3/1980 | Masaki et al. . |
| 4,392,133 | 7/1983 | Lundgren . |
| 4,499,462 | 2/1985 | Stoesser et al. . |
| 4,519,228 | 5/1985 | Sornes . |
| 4,573,046 | 2/1986 | Pinnow . |
| 4,596,985 | 6/1986 | Bongard et al. . |
| 4,607,312 | 8/1986 | Barreto-Mercado . |
| 4,663,626 | 5/1987 | Smith . |
| 4,665,397 | 5/1987 | Pinnow . |
| 4,761,644 | 8/1988 | Kawai et al. . |
| 4,835,531 | 5/1989 | Sato . |

FOREIGN PATENT DOCUMENTS

| | | |
|---|---|---|
| 2580128 | 10/1986 | France . |
| 2922262 | 12/1980 | Germany . |

*Primary Examiner*—Edwin C. Holloway, III

*Attorney, Agent, or Firm*—Tarolli, Sundheim, Covell Tummino & Szabo

[57] ABSTRACT

A remote control system which includes (a) a receiver unit adapted to be fixedly mounted on a motor vehicle leaving at least one door lock with a first locked condition and a second unlocked condition and having circuitry for receiving a coded signal including a code portion of binary bits, memory circuitry for storing a first code of binary bits, means for comparing the code portion of a received coded signal with the first code and circuitry for shifting the controlled device to one of the conditions upon the comparison match between the code portion of a received signal and the stored first code and (b) a transmitting unit for transmitting the stored second code of binary bits when the door lock is to be shifted into one of its conditions. In this system the invention involves the improvement wherein the coding of the second code set into the transmitter is a unique group of binary bits and the receiver unit includes a field programming arrangement for setting the first code of the receiver unit to the unique group of binary bits in the transmitting unit by using the signal from the transmitting unit as received by the receiver unit. In accordance with this improvement, the first code of the receiver unit is set to the second code of the transmitting unit in the field and may be changed from one code to another code upon authorized use of a second transmitting unit having its own unique code.

4 Claims, 11 Drawing Sheets

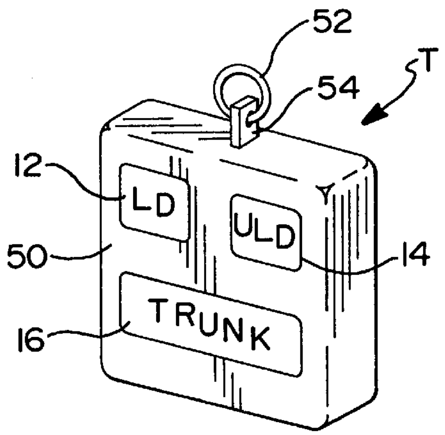
FIG 1A
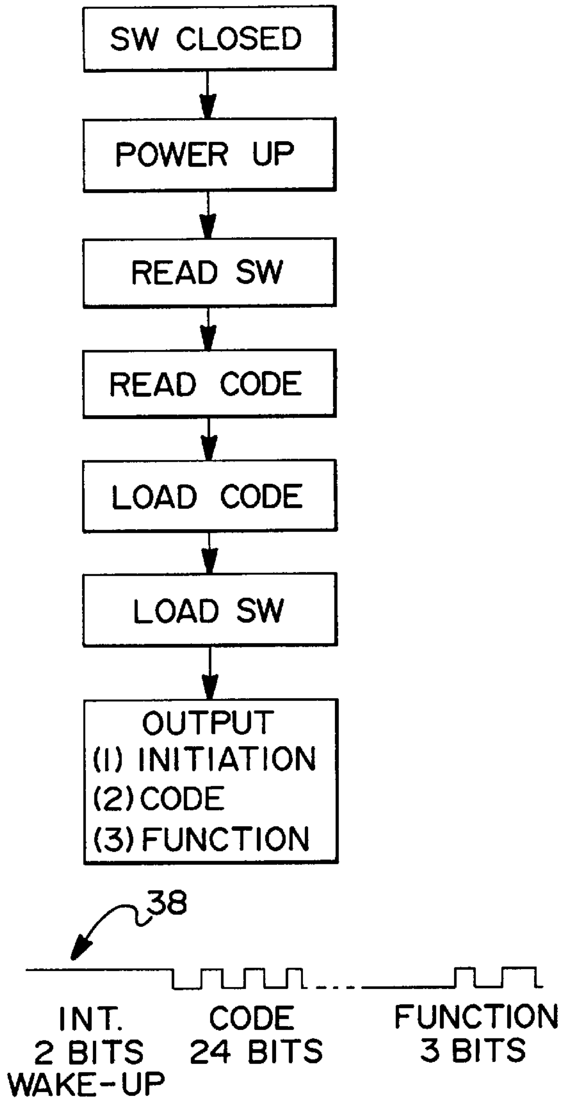
FIG 1B
FIG 4
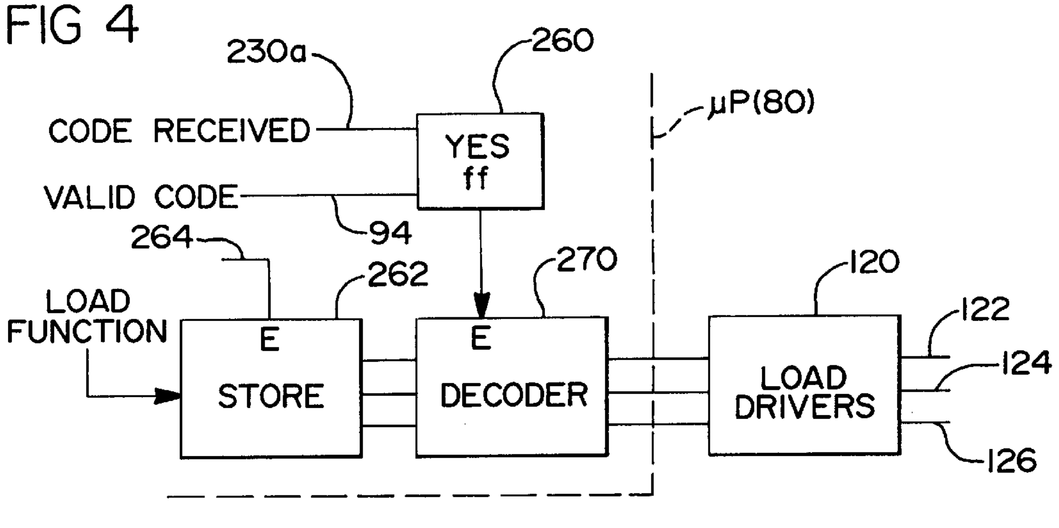

FIG 3A
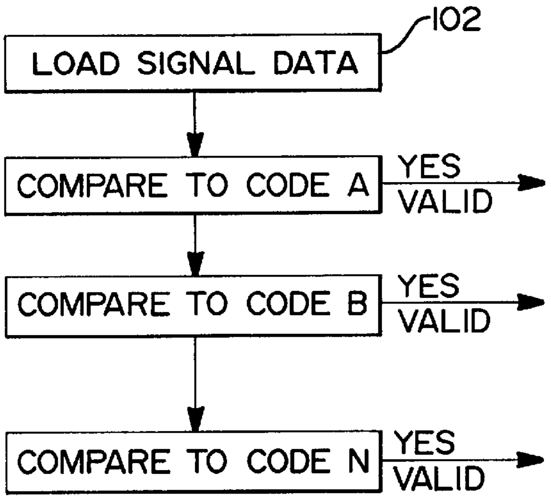
FIG 3B
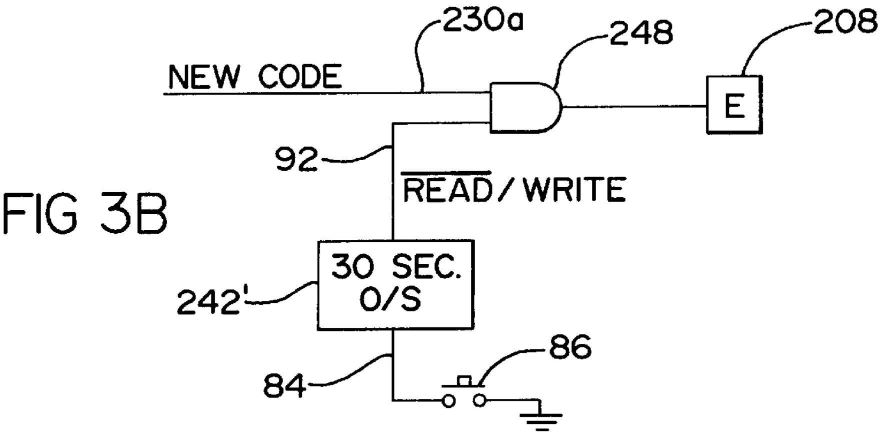
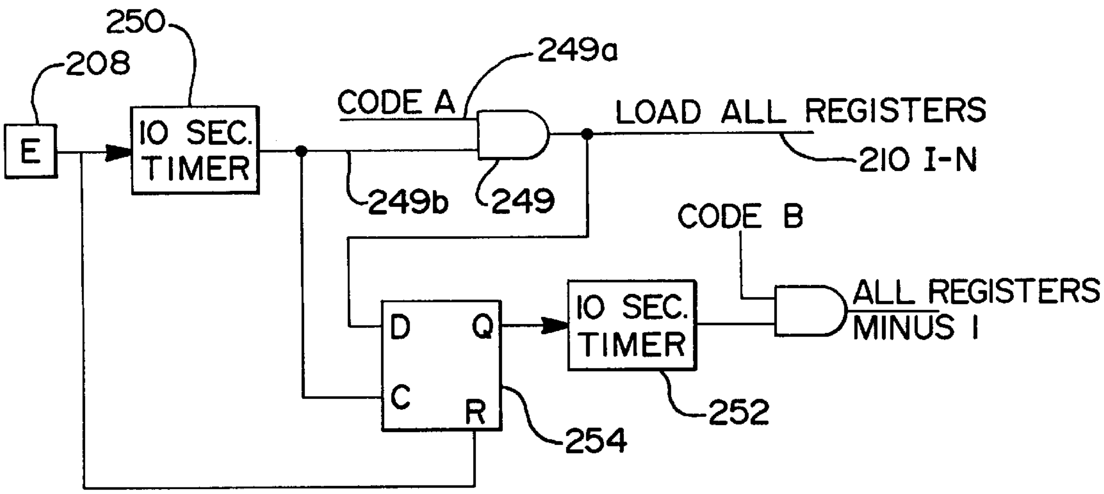
FIG 3C

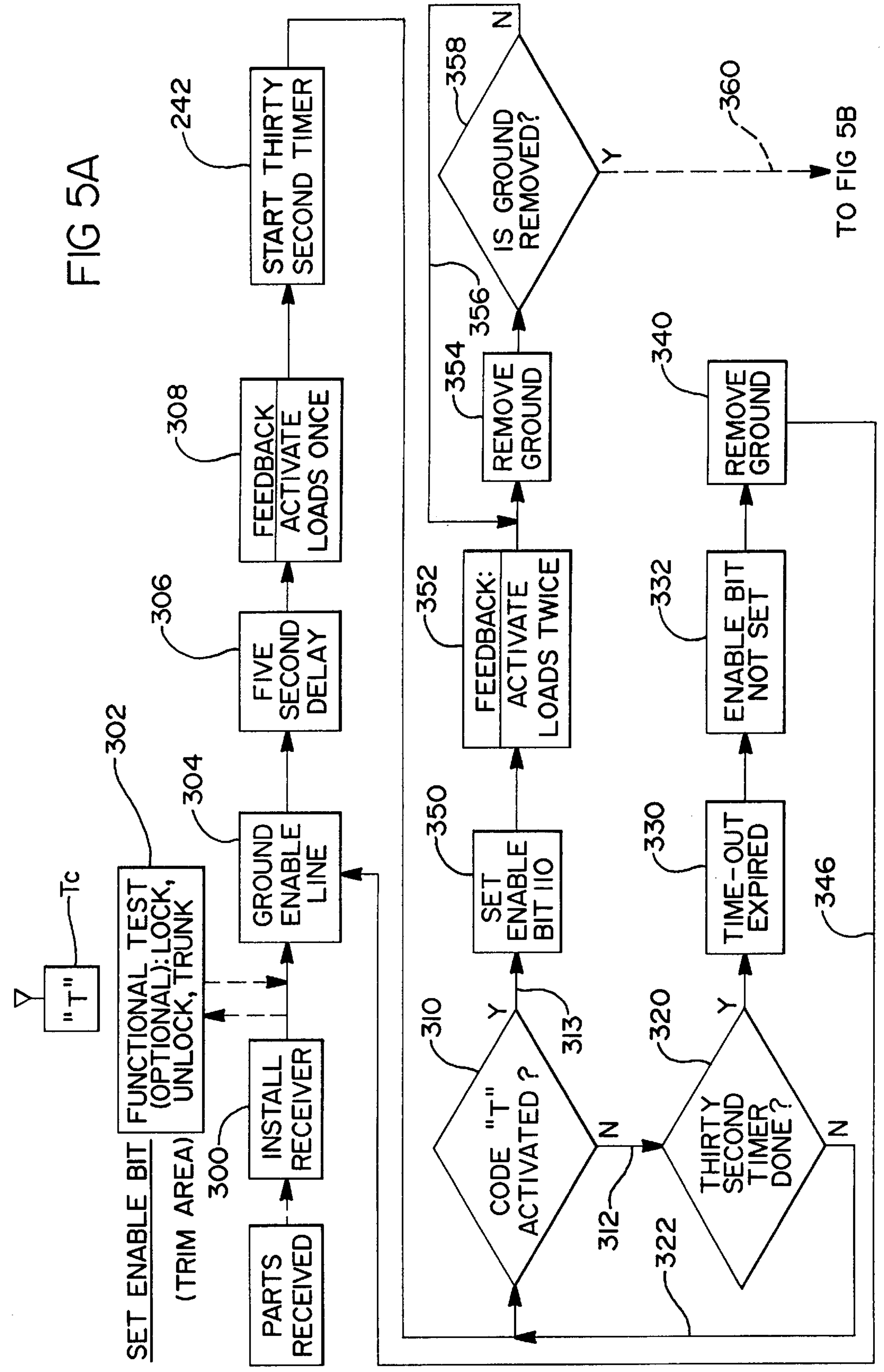
FIG 5A
SET ENABLE BIT
(TRIM AREA)
"T"
Tc
PARTS RECEIVED
INSTALL RECEIVER
300
FUNCTIONAL TEST (OPTIONAL):LOCK, UNLOCK, TRUNK
302
GROUND ENABLE LINE
304
FIVE SECOND DELAY
306
FEEDBACK ACTIVATE LOADS ONCE
308
START THIRTY SECOND TIMER
242
CODE "T" ACTIVATED ?
310
Y
N
312
313
SET ENABLE BIT 110
350
FEEDBACK: ACTIVATE LOADS TWICE
352
REMOVE GROUND
354
356
IS GROUND REMOVED?
358
Y
N
360
TO FIG 5B
THIRTY SECOND TIMER DONE ?
320
Y
N
322
TIME-OUT EXPIRED
330
ENABLE BIT NOT SET
332
REMOVE GROUND
340
346

FIG 6
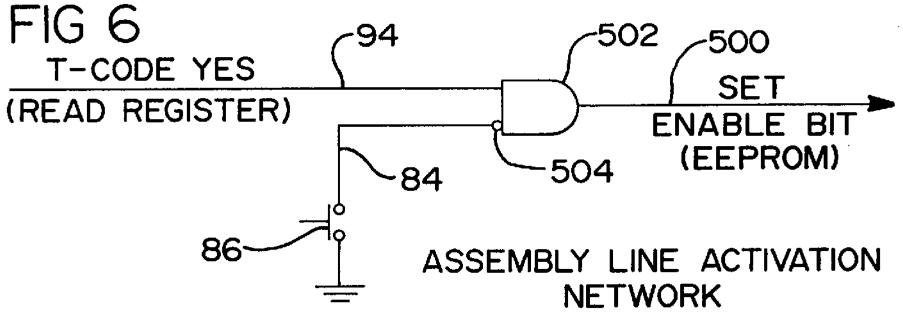
FIG 7
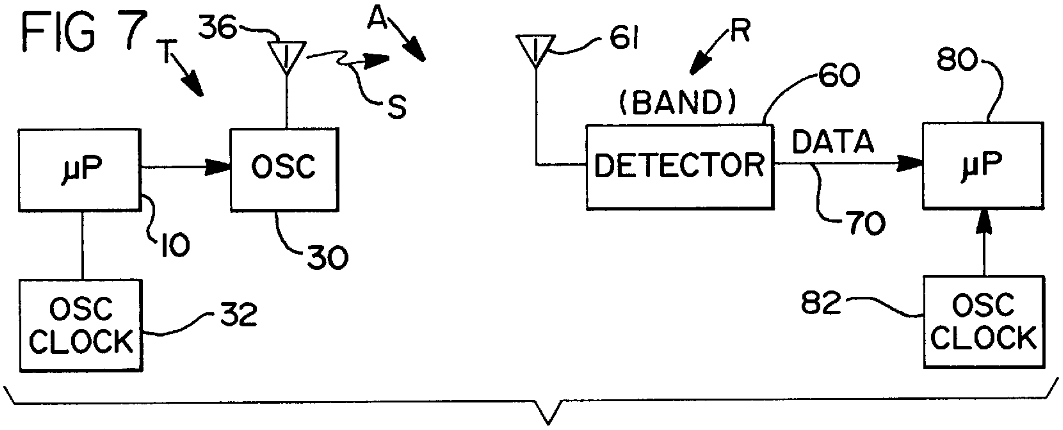
FIG 8
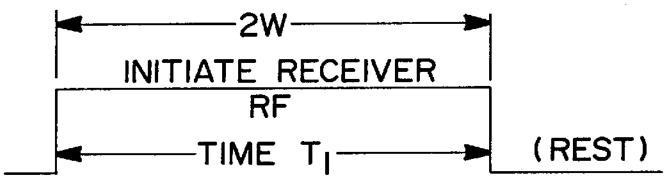
FIG 9
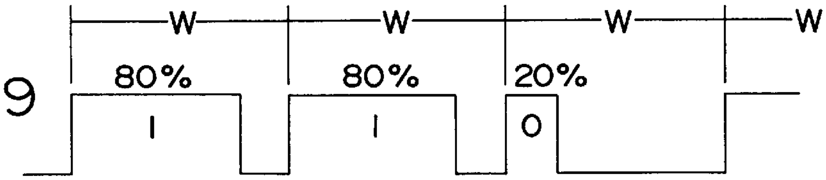
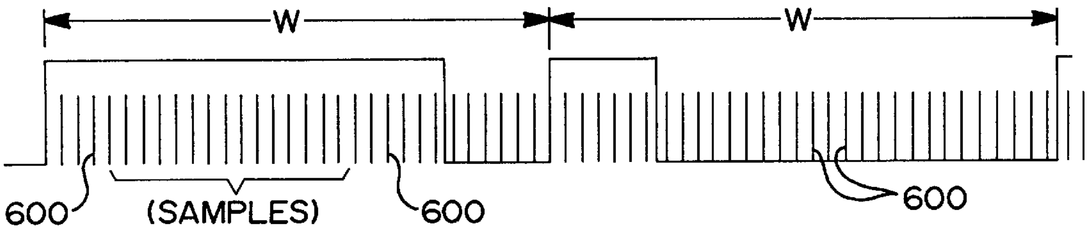
FIG 10

FIG 12
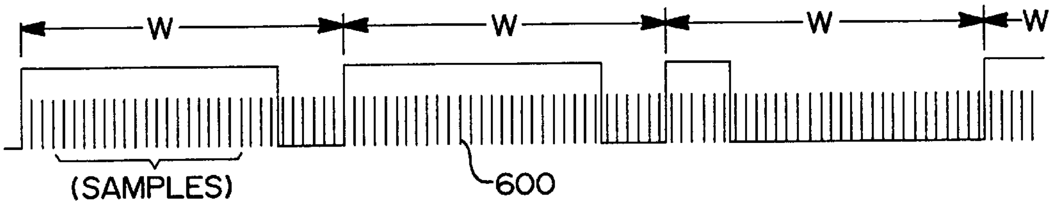
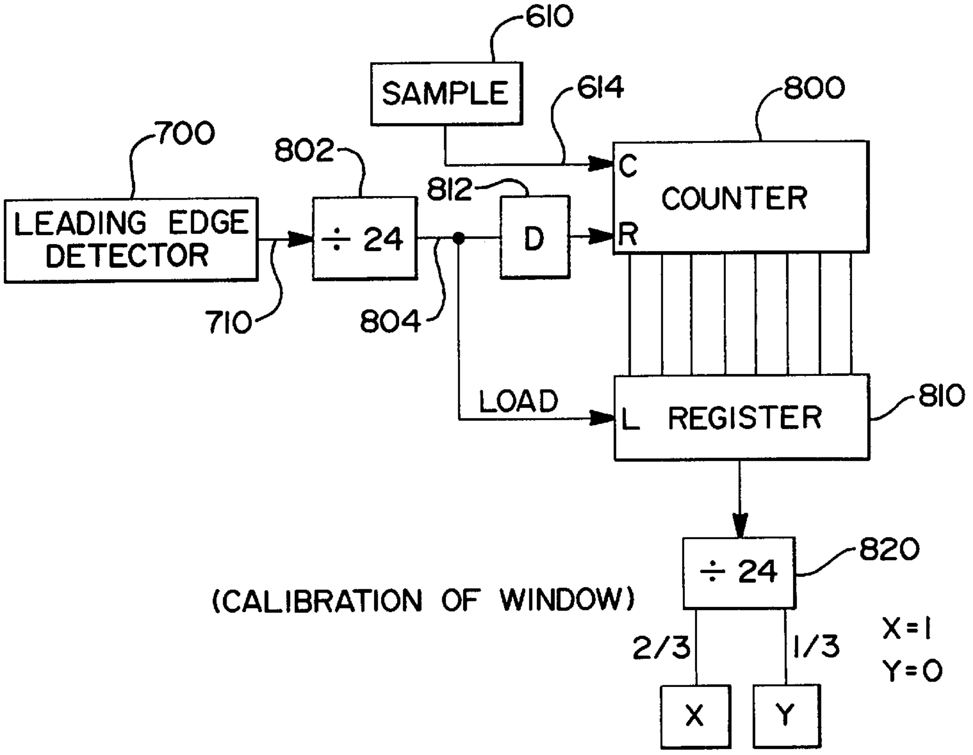
FIG 13

REMOTE CONTROL SYSTEM FOR DOOR LOCKS

This application is a continuation of application Ser. No. 08/419,447, filed on Apr. 10, 1995, now U.S. Pat. No. 5,619,191, which in turn is a continuation of application Ser. No. 08/133,744, filed on Oct. 7, 1993, now U.S. Pat. No. 5,406,274, which in turn is a continuation of application Ser. No. 07/767,034, filed on Sep. 26, 1991, now U.S. Pat. No. 5,252,966, which in turn is a continuation of application Ser. No. 07/336,841, filed on Apr. 12, 1989, now U.S. Pat. No. 5,109,221, which in turn is a division of application Ser. No. 07/262,206, filed Oct. 19, 1988, now U.S. Pat. No. 4,881, 148, which in turn is a continuation of application Ser. No. 07/052,469, filed May 21, 1987, now abandoned.

The present invention relates to the art of controlling the door locks of a motor vehicle and more particularly to an improved remote control system for unlocking and locking vehicle doors utilizing a hand held transmitting unit or transmitter.

The invention is particularly applicable for use in remote control of the door locks in a motor vehicle and it will be described with particular reference thereto; however, the invention is equally applicable for actuating various control devices on a motor vehicle, as well as control devices on other structures such as locks on residential doors and mechanical garage door operators.

INCORPORATION BY REFERENCE

Perron U.S. Pat. No. 4,031,434 is a prior art patent illustrating an inductively coupled vehicle door lock system wherein a binary coded signal is transmitted from a hand-held transmitter to a vehicle mounted receiver which recognizes the binary code and compares the code to a programmable lock code for the purpose of selectively locking and unlocking a vehicle door. This general control system is incorporated as background information. This patented unit is not a remote control unit in that the key member must be positioned adjacent the receiver for the purposes of actuating the door locking motors. Actual remote control systems are disclosed in Bongard U.S. Pat. No. 4,596,985 and Barreto-Mercado U.S. Pat. No. 4,607,312. These two patents are also incorporated by reference herein as being representative of prior art control systems employing one or more binary codes for the purposes of actuating devices from a remote position by transmitting a binary code to a receiver for recognition and processing. A specific code can be set into the transmitters of these two patents by dip switch coding, by punched hole coding, such as cutting resistors, and by using a plug-in code unit.

BACKGROUND OF INVENTION

For many years the automotive industry has sought a remote control system which could be assembled into a motor vehicle at the factory and employed by the ultimate purchaser for controlling various functions of the motor vehicle from a hand-held transmitter. Such systems were envisioned for operating the door locks and trunk latch so that a driver could lock the doors upon leaving the vehicle or unlock the doors as approaching the vehicle. In addition, it was anticipated that such remote control system should also operate the trunk latch so that a hand-held transmitter could be employed for the purpose of unlocking the trunk as the driver approached the vehicle for the purpose of facilitating loading of the trunk without the need for manipulating a key which can present difficulties and inconveniences when burdened with packages, at night when vision is hampered or when ice inhibits insertion of a standard key. Such remote control systems have been sought by the automobile industry for the purpose of either standard equipment or as an option; however, even though the concept appears quite susceptible to implementation, substantial problems have been encountered in efforts to develop such a successful remote control system. These difficulties have caused much interest in an approach which satisfies the demands of the automobile industry regarding price and lack of customer complaints.

The most prevalent concept to be employed for such a remote control system has been the use of a binary identification code which is transmitted from a transmitter by employing a modulated radio frequency signal having a coded portion that is indicative of an identification binary code. The binary code of such suggested system is fixed into the receiver and is outputted as a series of pulses of the radio frequency, which pulses have intelligence constituting the desired identification code. This binary identification code is fixedly contained in a receiving unit secured onto the motor vehicle, which receiving unit has a detector that allows passage of the particular radio frequency of the transmitter. Filters or other processing circuits convert the incoming coded signal into a replica of the binary code from the transmitter. This replica is compared to the identification code in the receiver and determines whether or not the coded portion of the transmitted signal matches the identification code stored in the receiver. Upon acknowledgement of a match between an incoming code portion of a received signal and the stored identification code in the receiver, the door lock is actuated. In accordance with this remote control concept, the identification code being transmitted to the receiver is accompanied by an appropriate function code of a binary nature, which function code is decoded upon matching of the identification code so that the desired function will be initiated by the receiver mounted in the motor vehicle. This desired function can be to lock the door, unlock the door or unlatch the trunk. Of course, other desired functions could be incorporated into the transmitted signal and identified by the receiver, such as activating the ignition system, initiating a security system, flashing the headlights, activating the horn, etc. to mention only some of the more obvious functions which could be controlled by the receiver upon identification of the proper incoming signal. Technology for accomplishing these various control functions is available. Many variations of this control theme have been suggested for controlling the door locks or the trunk latch of a motor vehicle.

Extensive effort to incorporate a remote control system, as explained above, as an OEM installation for motor vehicles has resulted in serious technical and practical impediments. Since the identification code in the receiver and transmitter must be functionally identical, the receiver and transmitter must be kept together during assembly of the vehicle. Since it is necessary that the receiver be mounted in an unaccessible, hidden position in the vehicle, the transmitter matched to the receiver must remain with the car as it is being assembled, painted, transported, displayed and sold. Should the transmitter be separated from the motor vehicle, the system is useless without some code arrangement maintained associated with the vehicle. A replacement transmitter would not have the same identification code as the factory mounted receiver. Consequently, the receiver would have to be disassembled, recoded, and matched with a new transmitter. The capability of accomplishing this goal is self-defeating, since the receiver now must be easily accessible and easily reprogrammed for a new identification code. The advantage of original equipment on the vehicle employing a remote control system is that the receiver can be assembled in the motor vehicle at a remote or hidden location so that disassembly and recoding is impossible. Only in this manner can the ultimate purchaser of the vehicle be assured that other persons do not gain access to the vehicle with another remote control transmitting unit. In addition, when a receiver is mounted at the factory, problems can be experienced when the hand-held transmitter unit is lost or misplaced. A new hand-held transmitter will not have the code of the receiver on the vehicle. One arrangement for solving this particular problem would be for the code of the receiver to be in some manner, maintained by the dealer or by the purchaser. Then, a manually manipulated coding arrangement could be imparted to a new transmitter for code matching purposes. To use this concept, the programming must be somewhat rudimentary and simple which defeats the intended security level of the system and destroys the basic objective of the original implementation of a factory assembled remote door lock control system. With the code being maintained by the dealer, security is compromised and record keeping must extend for the life of the vehicle. These factors are unacceptable.

Other difficulties have been experienced in matching receivers and transmitters employing binary transmitted codes. If a second transmitter is desired for use by another person, it must match to the transmitter originally supplied with the vehicle. To do this, the transmitter code must be read externally or again maintained by the dealer. A person finding the transmitter unit or gaining access to the dealer records could determine the code and prepare a duplicate without the car owner knowing that a duplicate transmitter exists.

As can be seen, the concept of mounting a receiving unit in the vehicle itself in an inaccessible location at the factory and also producing a security code concept which can not be manually duplicated by anyone having the original transmitter, another transmitter or access to dealer records presents serious problems. These problems have resulted in the inability of the automobile industry to develop a remote control system which is acceptable to the public and unobtrusive to the vehicle manufacturer with respect to code correlation and identification code security.

THE PRESENT INVENTION

The present invention relates to a remote control system to be used for operating the door lock of a motor vehicle and which overcomes all the disadvantages of systems heretofore developed of the type having a receiver mounted at the factory in an inaccessible location on the vehicle. This system includes a transmitter that need not be matched with the assembled receiver, until delivery of the motor vehicle to the ultimate purchaser.

In accordance with the present invention, there is provided a remote control system of the type including a receiving unit adapted to be fixedly mounted on a motor vehicle and having at least one door lock with a first locked condition and a second unlocked condition. The receiving unit includes means for receiving a coded signal, including a code portion of binary bits, memory means for storing a first code of binary bits, means for comparing the code portion of a received coded signal with the first code and means for shifting the door lock to one of the conditions upon a comparison match between the code portion of a received signal and the stored first code. A corresponding transmitting unit is employed which includes means for storing a second code of binary bits, selector means for indicating a desire to shift the door lock to one of the conditions, means responsive to the selector means for transmitting a coded signal including a second code at the code portion of the transmitted signal. This transmitted signal has a signal strength sufficient to drive the receiving means when the transmitting unit is in proximity to the receiver unit. This system further includes programming means for setting the first code to match the second code by coding the second code to a unique group of binary bits and then field programming the first code into the receiver with the unique group of binary bits by using the signal transmitted from the transmitting unit for such field programming.

By using the present invention, a unique binary code is loaded into a transmitting unit. This unique code is randomly selected from a source, such as a number generator, when the transmitting unit is first manufactured and shipped. Consequently, the transmitting unit has a specific unique binary code, which code is not correlated during the manufacturing thereof in any fashion with a particular receiver unit. In the field, after the vehicle has been fully assembled with a transmitter unit located in a secure location within the vehicle itself, the transmitting unit itself is used for programming the code in the receiver. By employing this aspect of the invention, there is no need to match a receiver unit and transmitting unit. A universal receiver unit is assembled into all the motor vehicles and then programmed to match a particular hand-held transmitter.

In accordance with another aspect of the present invention, the receiver unit includes a universal code when delivered to the automobile factory, so that all receivers have the same universal code when they are assembled at the factory. In this fashion, a special transmitting unit at the assembly plant is set to the universal code and can test the operability of each receiver unit without regard to the identification code which will be subsequently set into the receiver unit. The manufacturer of the transmitting units and receiving units can provide a different universal code for different automobile manufacturers so that receiving units for each automobile manufacturer can have a different, known universal code. The universal code is for manufacturing convenience and not for ultimate security. The dealer, upon receiving delivery of the vehicle, will receive a transmitting unit having a unique code or have a supply of these units each having its own code. Upon delivery to the ultimate purchaser, the dealer will use a transmitting unit randomly selected by the manufacturer or dealer, but having a unique code, to shift the universal binary code loaded into the receiver at the factory to the unique code of the randomly selected transmitter provided to the purchaser by the dealer. By utilizing this unique coding scheme, there is no need to match receivers and transmitters. A replacement transmitter can be supplied at any time and used in the system by merely changing a receiver unit identification or security code to match the unique binary code of the replacement transmitter.

In accordance with another aspect of the present invention, the receiver unit of the system includes more than one register for storing a group of binary bits. Each group of bits constitutes a first code of the receiver means. A write enabling means is provided, so that a manually operated switch, at the receiver, can enable all registers to accept the binary code received by the receiver unit from any randomly selected transmitting unit. By providing a write enabling signal manually and transmitting a coded signal from a randomly selected transmitting unit to the enabled receiving unit, the codes in the registers of the receiving unit are shifted from either the universal code (during initial programming) or an existing code, to the binary code of the signal being received from the transmitting unit. By this aspect of the invention, the code of the receivers can be set in the field by use of any transmitting unit. Thereafter that transmitting unit becomes the matching unit for remote control of the receiver.

In accordance with another aspect of the invention, after a first identification code is loaded into all registers of the receiver, a second code can be loaded into the registers from a second randomly selected transmitting unit. This second code will load each register of the receiver, except for a first register. Consequently, the first register retains the first code setting. During a preselected time, such as 30 seconds, a third code can be loaded from a third transmitter. This code by-passes the first and second register and loads all subsequent registers, if any are in the receiver. In this fashion, two or more transmitting units can be employed for setting an identification code in a receiver. Consequently, one of the two or more transmitting units employed for setting the codes during the preselected time can be recognized by the receiver unit for operating the door locks or other controlled device.

When a WRITE signal is created, all registers in the receiving unit remain enabled for the preselected time. During this preselected time, the first code received by the receiver loads all registers; therefore, any preexisting identification code in any register is removed. By employing this inventive concept, the owner of a vehicle has a particular transmitting unit or units. If the unit or units do not function at all, meaning a new code has been loaded into the registers, the authorized operator will realize that his vehicle has been recorded. Since any recoding destroys all existing coding, an unauthorized person can not surreptitiously code a selected unused register of the receiver. By employing this aspect of the invention, an unauthorized person having a transmitting unit and knowing the resetting concept for the receiver unit could not reset the receiver unit to a separate transmitting means without ultimately being realized by the vehicle owner.

During the time when the WRITE signal is initiated for field programming of the receiver, the first code can be received and written into all registers. During a second time, still during the preselect programming time, the second code can be received and written into all registers, except the first. After the WRITE signal has been created, in practice, approximately 30 seconds, the programming process must be repeated. This feature will not allow an unauthorized person to insert an unwanted identification code at the lower portion of the register stack.

By incorporating these various aspects of the present invention, a secure, remote control system is provided which is field programmable, but which can not be preempted for unauthorized use of other transmitting units. In accordance with the present invention, the transmitting units each have a unique code which is different from all other codes. In practice, twenty-four bits are employed in the security code; therefore, the unique code in each of the transmitting units need not be duplicated. The use of this concept of a unique randomly selected, not recorded, code for the transmitter and the field programming to this code by the receiver gives extreme versatility and simplicity to the new remote control system. These features make the new system acceptable to the automobile industry for the purposes of OEM installation.

In accordance with another aspect of the present invention, a remote control system, as described above, is provided with a unique arrangement for correlating the recognition factor of the receiver unit with the received signal, whereby the clocking oscillator in the transmitter does not have to be matched with the receiving or clocking oscillator of the receiver unit. By incorporating this aspect of the present invention, matched, crystal controlled oscillators are not necessary for a set of transmitting and receiver units. Without employing a crystal control oscillator in the transmitting unit and without matching the oscillator of the transmitting unit with the oscillator of the receiver unit, the system, when using this aspect of the invention, recognizes the proper code and is positive in operation. The receiver is synchronized with the transmitter by using the incoming signal of the receiver. Noises and changes in magnitude of the signal caused by the different locations of the transmitting unit with respect to the receiving unit during successive operations of the system are not major factors in operation of the system itself. In accordance with this aspect of the invention, the transmitted binary logic signal includes a succession of windows (each a bit) wherein a given logic state is held for a first time indicative of the first binary number or for a second different time indicative of the second binary number. Transmitted coded signals involve a series of pulses each having a preselected time correlated with the time of a signal window. Such windows extend between two successive leading edges of the transmitted coded signal. By employing this coding concept, the logic state can be transmitted as a percentage of the signal window or bit in the coded signal, i.e. 80% of a bit is a logic 1 and 20% of a bit is logic 0. At the receiver, a leading edge detector can record the time between successive leading edges of the coded signal, which time can be averaged to produce a corresponding window, or bit length, in the received coded signal. By correlating the window, or bit length, of the coded signal, the percentage of given logic state indicative of the two binary numbers will allow the binary numbers to be read at the receiver, irrespective of the variations in length of the transmitted window caused by the unregulated oscillator in the transmitting units or other changes in the clocking oscillator of the transmitting unit, or various random noise. The number of windows employed for averaging the length of a window can be changed. It is within the scope of this aspect of the invention to disregard windows or bit length readings having a drastically different length than an expected window length. Such abnormal readings could be indicative of signal spikes or other random noise.

By utilizing this unique coding concept and incorporating this concept with the above-mentioned other aspects of the present invention, an inexpensive remote control system is obtained which can be employed on motor vehicles without limitations heretofore experienced and at low cost necessary for use in mass produced motor vehicles.

The primary object of the present invention is the provision of a remote control system, as defined above, which remote control system is inexpensive, need not have matched transmitting and receiving units and which may be programmed in the field in a manner offering security as well as flexibility.

Yet another object of the present invention is the provision of a remote control system, as defined above, which remote control system is easy to program, universal in application and usable in various structural environments including, but not limited to, motor vehicles.

Still a further object of the present invention is the provision of a remote control system, as defined above, which system incorporates a unique coding concept and an arrangement for modifying the receiving unit to accommodate variations in the receiving signal so that imprecise oscillators can be employed without sacrificing the positive operating characteristics of the total system.

Yet another object of the present invention is the provision of a remote control system, as defined above, which system employs a receiving unit which can be mounted in an obscure or hidden location in a motor vehicle, as the vehicle is being assembled, without sacrificing versatility in coding and without requiring matching of the transmitting unit with the receiver unit until ultimate disposition of the manufactured motor vehicle.

Another object of the present invention is the provision of a remote control system, as defined above, which system employs a transmitted binary coded signal utilizing a duty cycle for identifying binary numbers and employing a universal code for operating the system until field programming is accomplished, so that the system may be tested during assembly of the vehicle without final programming of the total system.

Another object of the present invention is the provision of a remote control system, as defined above, which remote control system incorporates a receiver unit which can be reprogrammed in the field and which indicates to the owner of the structure on which the system is mounted that an unauthorized reprogramming has occurred.

Still a further object of the present invention is the provision of a remote control system, as defined above, which remote control system utilizes a transmitting unit having a unique identification or security code which can not be determined from the transmitting unit itself. In accordance with this object of the invention, the system employs an identification code in the transmitting unit which can not be set after it leaves the plant or factory in which the transmitting unit is manufactured. Each transmitting unit has its own unique code. This unique code is employed for setting the identification code in the receiver unit so that there is no need for matching transmitting unit and receiving unit.

These and other objects and advantages will become apparent from the following description taken together with the accompanying drawings which are described in the following section.

BRIEF DESCRIPTION OF DRAWINGS

The drawings in the present invention are as follows:

FIG. 1A is a pictorial view of the transmitting unit in the form of a key holder;

FIG. 1B is a block diagram illustrating the system employed for outputting coded information from the transmitting unit to the receiver unit in FIG. 1;

FIG. 3A is a block flow chart illustrating the system concepts utilizing more than one identification code in the receiver unit shown in FIG. 1;

FIG. 3B is a logic diagram illustrating the arrangement for creating a WRITE signal for use in loading the registers of the integrated circuit shown in FIG. 2;

FIG. 3C is a logic diagram similar to the logic diagram of FIG. 3B illustrating the concept for loading successive different codes in the integrated circuit, as shown in FIG. 2;

FIG. 4 is a block diagram of the output portion of features performed by the microprocessor employed in the receiver unit of the preferred embodiment as shown FIG. 1;

FIG. 6 is a logic diagram illustrating the arrangements employed for creating a load releasing signal in the preferred embodiment of the invention;

FIG. 7 is a block diagram similar to FIG. 1 illustrating the unmatched, unregulated oscillator arrangement employed in the preferred embodiment of the present invention;

FIG. 8 is a pulse diagram showing the minimum initiation signal transmitted from the transmitting unit to the receiving unit for initiating the receiving unit;

FIG. 9 is a pulse diagram illustrating the duty cycle type of pulses during window or bit W for indicating the binary logic in the code portion of the transmitted and received coded signal;

FIG. 10 is a pulse diagram illustrating the sampling pulses or signals employed in the receiver unit, in accordance with one aspect of the present invention;

FIG. 12 is a pulse diagram similar to FIG. 10 illustrating a succession of windows or bits $W_4$; and, FIG. 13 is a logic diagram of the system for calibrating the receiving unit to correlate the receiving unit with the actual width of the windows or bits in the coded portion of the received signal.

PREFERRED EMBODIMENT

Figure 1:
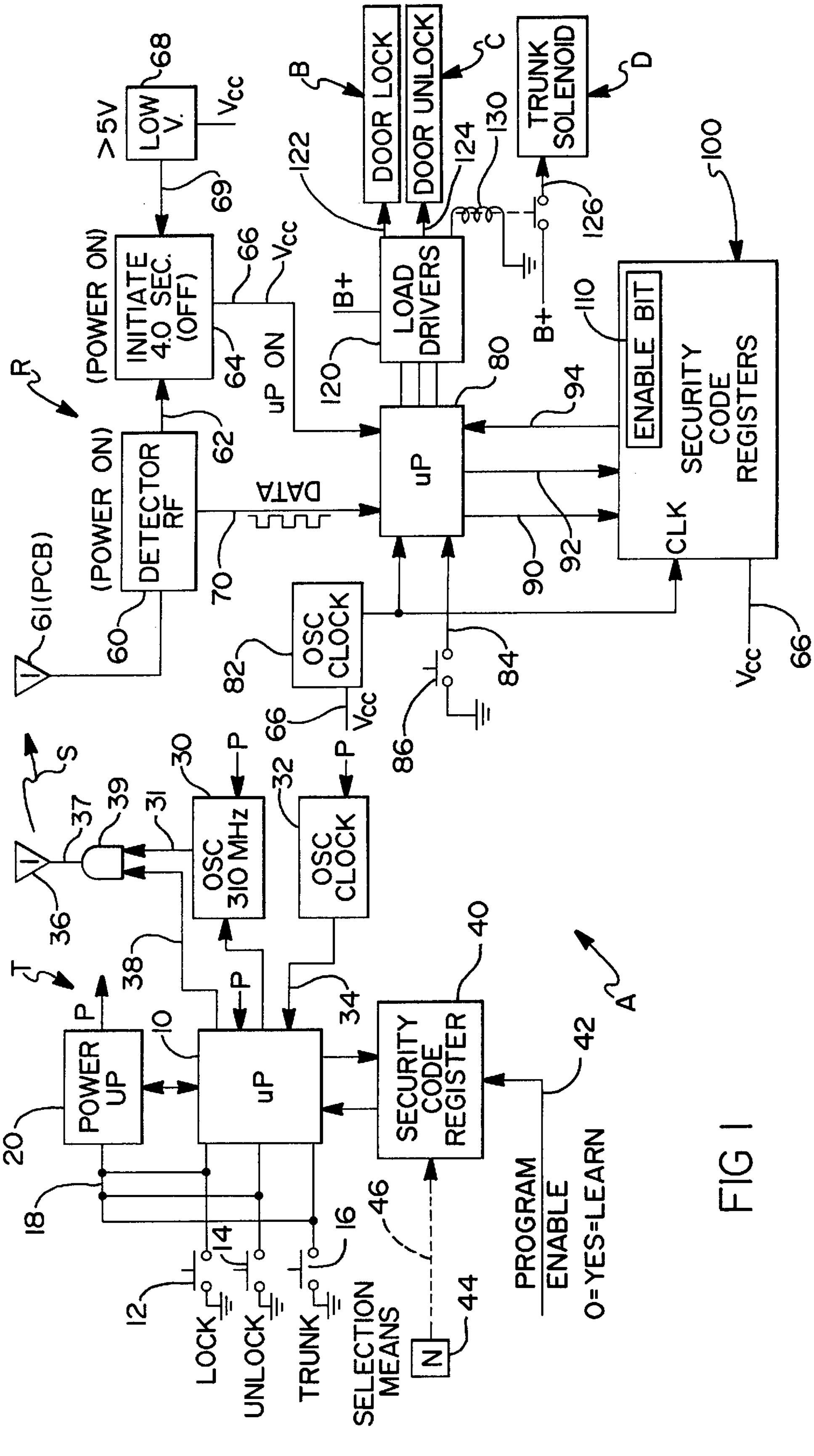
FIG. 1 is a block diagram illustrating, schematically, the transmitting unit and receiver unit of the preferred embodiment of the present invention employed for controlling door locks and the trunk solenoid of a motor vehicle.

Referring now to the drawings wherein the showings are for the purpose of illustrating a preferred embodiment of the invention only, and not for the purpose of limiting same, FIG. 1 shows a remote control A for selectively operating a door lock, mechanism B, door unlock mechanism C or trunk solenoid D to release the trunk of a motor vehicle. System A includes a transmitting unit T for creating a coded signal S to be transmitted to receiver unit R, whereby the doors of the vehicle can be locked or unlocked or the trunk can be released at will from a distance of at least 20–50 feet. The radiating strength of signal S must be sufficiently weak so that remote control system A is effective when transmitter T is in the general vicinity of the vehicle onto which the receiver unit R is fixedly mounted. Stronger signals S may cause atmospheric electromagnetic interference which could be objectionable under Federal regulations. Transmitting unit or transmitter T includes a special purpose, or custom, microprocessor having appropriate internal PROMs and RAMs programmed to perform the functions of the system, as hereinafter described, and having sufficient I/O terminals controlled by selector means or switches 12, 14, and 16. In accordance with the illustrated embodiment, switch 12 is depressed when system A is to lock the doors of the vehicle by operating mechanism B. In a like manner, switch 14 is manually operated to unlock the vehicle doors by actuating door unlocking mechanism C. The trunk solenoid D or mechanism for unlatching the vehicle trunk is actuated by depressing manual switch 16. Upon depressing one of these switches 12–16, a power up circuit 20 directs power to the microprocessor or clip 10 and actuates oscillators 30 and 32. In the preferred embodiment switches 12 and 16 power system A and cause a single transmission of a coded signal. Thereafter, circuit 20 is deactivated to await a new requested function. When switch 14 is depressed, a single data transmission is initiated. This unlocks only the driver's door of the vehicle. Microprocessor 10 continues to interrogate switch 14 for a short time, such as 2.5 seconds. If the switch is released during this time, circuit 20 is deactivated. If switch 14 is held for the 2.5 seconds, transmitter T will transmit a second signal having a function portion to unlock all doors of the vehicle. Other arrangements are possible to control the door locks, etc.

Oscillator 30 has a nominal frequency of 310 MHz, in the preferred embodiment, which frequency is essentially the same frequency employed for common garage door operators. Clock oscillator 32 is unregulated in that it does not have a crystal control and may vary as to its frequency with temperature changes and manufacturing tolerances. The output of oscillator 32 is used to time the function of microprocessor 10 to shift line 38 to a logic 1 whenever a binary 1 is to be transmitted by antenna 36. Microprocessor output line 38 is one input of AND gate 39 having a second input controlled by the output 31 of oscillator 30. Consequently, the signal in output 37 of gate 39 is a series of binary conditions (logic 0 and logic 1) superimposed on a 310 MHz carrier. Consequently, transmitted signal S, when microprocessor 10 is powered by circuit 20, will be a series of pulses having a length or duration controlled by the logic in line 38. Lines P are now power lines actuated upon command of circuit 20.

As will be described later, the code on signal S is binary, with a binary 1 and a binary 0 being distinguished from each other by having a difference in length or duration. This pulse length is controlled by the frequency of oscillator 32 which is not an high priced oscillator with quartz control; therefore, the relationship between a binary 0 and a binary 1 for the identification code in transmitted signal S is the relative pulse lengths of a logic 1 and a logic 0. These lengths vary according to the particular frequency of oscillator 32 but maintain their numerical relationship since they are based upon counts of the clock in line 34. In this manner, oscillator 32 can be relatively inexpensive so the frequency or clock in line 34 will not be identical from one transmitter T to another transmitter. Indeed, during different operating conditions in a particular transmitting unit the clock in line 34 can drift in frequency.

By employing the power up concept, power at lines P is not applied to the oscillators and the microprocessor until there is a selection by depressing one of the switches 12–16. When this occurs, power up circuit 20, which includes the battery (normal 5.0 volts), directs power to the microprocessor for a preselected time which is controlled by a one shot actuated upon applying a logic 0 to line 18. The length of the time of the one shot is sufficient to transmit one control signal. This signal includes, in practice, at least two initiation bits, twenty-four bits of identification code and at least three bits of the function data to indicate which switch 12–16 has been closed. When a switch is depressed, a single data signal is sent; however, after a preselected time another signal, to unlock all doors, is sent if switch 14 has not been released. The concept employs standard logic commands to unlock all doors by holding switch 14 for a given time. Of course, other functions could be controlled by the remote control system A by incorporating additional selector means or switches 12–16. As illustrated in FIG. 1A, transmitting unit T is a hand-held key ring having an appropriate array of finger tip switches 12–16, in a case 50 which can include a key ring 52 on a swivel connection 54. The hand-held case 50 is retained by the operator of the vehicle so that as the operator approaches the vehicle signal S can be transmitted to receiver unit R by merely depressing one of the finger operated switches 12–16. Antenna 36 is provided on a PC board in case 50.

In the preferred embodiment, receiver R includes a detector 60 tuned to approximately 310 MHz so that as signal S is received by antenna 61 printed on a PC board of the receiver, detector 60 recognizes the frequency and allows the first portion of the signal to pass through line 62. This is the initiate or signal recognizing line for activating power up circuit 64 having an output 66 for directing logic power to microprocessor 80, such as 5.0 volts. Detector 60 includes a filter for removing the 310 MHz carrier so that the output data in line 70 includes a plurality of spaced, logic conditions in pulse form which pulses are directed to the serial input of microprocessor system 80 for processing after the microprocessor has been activated by the voltage in output line 66. The voltage in line 66 ($V_{cc}$) is monitored by low voltage circuit 68. If the voltage drops to about 3.5 volts, microprocessor 80 is reset by line 69 because logic 1 may not be easily recognized. As indicated, after 4.0 seconds, or another selected time, power in line 66 is turned off awaiting the next coded signal recognized by logic in line 62.

Microprocessor 80, as did microprocessor 10, includes a preprogrammed PROM together with an appropriate RAM for processing information in accordance with the system parameters of the present invention. An oscillator 82, similar to oscillator 32, drives this microprocessor and other circuits of the receiver. In accordance with an aspect of the invention, oscillators 32 and 82 are set to the same frequency; however, they are not matched and are not crystal controlled. Thus, the frequency of these two oscillators can be different within a relatively narrow range which could affect sensitivity of the receiver R to the coded received signal S from transmitter T. Microprocessor 80 of receiver R is calibrated to compensate for variations between clocking oscillators 32, 82. When stating that the two clocking oscillators are set to the same frequency, this concept indicates only that the frequencies of these two oscillators, when taken together with the processing performed by the microprocessors 10,80, produce the same general data transmission and data recognition. The actual oscillator frequencies could be different to still be generally matching in this context, such as by using different dividing networks. Calibration of the receiver will be described later in connection with FIG. 13.

To load a code into receiver R, microprocessor 80 includes a program enable line 84 groundable by manual manipulation of switch 86 mounted in the vehicle. The function and location of this switch or other terminal are known to the manufacturer and the dealer. By closing switch 86, microprocessor 80 is shifted to the code loading condition wherein identification codes or security codes contained in signals S can program receiver R in a manner beet explained later in connection with FIGS. 2 and 3. Binary data, in serial form, on data bus 90 from the microprocessor includes only the identification code or security code portion of a transmitted or received signal S. When switch 86 is closed, a selected logic in line 92 represents a WRITE signal for writing the binary logic of the security or identification code in data bus 90 into a EEPROM or custom integrated circuit 100. If the logic on line 92 is not the WRITE signal, the binary data on bus 90 is compared with the existing security codes or identification codes in the integrated circuit 100 to produce an appropriate compare designation signal in output line 94 which is communicated with microprocessor 80 to be processed into an indication that the coded portion of the receive signal S corresponds with one of the identification or security codes loaded in the registers of integrated circuit 100. As will be explained later, integrated circuit 100 includes an enable bit 110, which bit is set at the factory to allow programming by grounding the field program line 84. Enable bit 110 of circuit 100 is not set when receiver R is shipped to the automobile manufacturing or assembly plant and can be set only by a specially designed machine available to the manufacturer of the control system or by a designated company, such as the automobile assembly plant. Whenever this bit is not set, the signal in line 92 has no effect upon changing the logic of the registers contained in the code registers of circuit 100.

All of the circuits shown in FIG. 1 and so far discussed are somewhat standard solid state micro-chip components or are custom integrated circuits which can be produced using standard technology for accomplishing the defined functions. Power up circuit 20 controls the small batteries (5.0 volts) in transmitter T. Circuit 64 of receiver R directs power to the rest of the circuits in receiver R when circuit 64 is initiated by closing one of the switches 12–16 in transmitter T. Detector 60 includes a paas filter for the carrier frequency and a circuit to remove the carrier to create the envelope in data bus or line 70. Microprocessor 80 transfers only the identification or security code from bus 70 to line 90. The function portion of the code will be decoded in microprocessor 80 for the purpose of supplying actuation signals through load drivers 120 to appropriate outputs 122, 124 and 126 for the purpose of selectively operating previously identified mechanisms B, C and D. The B+ voltage for drivers 120 and relay 130 is the battery voltage for the vehicle onto which receiver unit R is mounted. If receiver R is mounted in a home or other building, the B+ voltage for the load drivers, etc. could be provided by an appropriate transformer, driven by the house voltage with a back-up or stand-by battery. This completes the general description of the preferred embodiment illustrated in FIGS. 1 and 1A.

Referring now to FIG. 1B, creation of a transmitted signal S by the transmitter is schematically illustrated. When one of the selector switches is closed, microprocessor 10 is powered up. The microprocessor then reads the switch and reads the identification or security code stored permanently in a custom integrated circuit 40, shown in the transmitter portion of FIG. 1. This integrated circuit has a single twenty-four bit register for storing a single unique code, which code is loaded into the register when transmitter T is manufactured. This code is unique and is not duplicated from one transmitter to the next. An appropriate program enable line 42, similar to line 84 of receiver R, allows this single register to be loaded with a random binary number generated by an appropriate number of generating devices. This code generation is done by serial loading from a number generator 44 through line 46 as shown in FIG. 1. Other random number generators can be used.

In the preferred embodiment, a known universal code is loaded into a control transmitter to be used at the factory for testing each receiver R shipped to the factory and after the receiver is mounted. All registers in circuit 100 of each shipped receiver R are preset to this known universal code. Consequently, all receivers and control transmitters sent to the factory have the same universal code. Each transmitter has it own unique code. The advantages and details of this concept will be described later.

After reading the unique transmitter code, as indicated in FIG. 1B, the unique code is loaded into RAM and the function of the depress switch is also loaded into the appropriate RAM of microprocessor system 10. Thereafter, the microprocessor system outputs an initiation signal or wake-up code which is generally over two bits of data, the identification or security code, which is usually twenty-four bits of data and the function code which may be eight bits of binary data. The initiation or wake-up signal is a steady logic 1 for two or more bits and is contained in signal 38 as shown at the bottom of FIG. 1. Signal 38 is directed by the line with the number to the input of AND gate 39 for the purpose of controlling the output of oscillator 30 used to create transmitted signal S. Signal S is then received by antenna 61 for processing by a receiver R.

Figure 2:
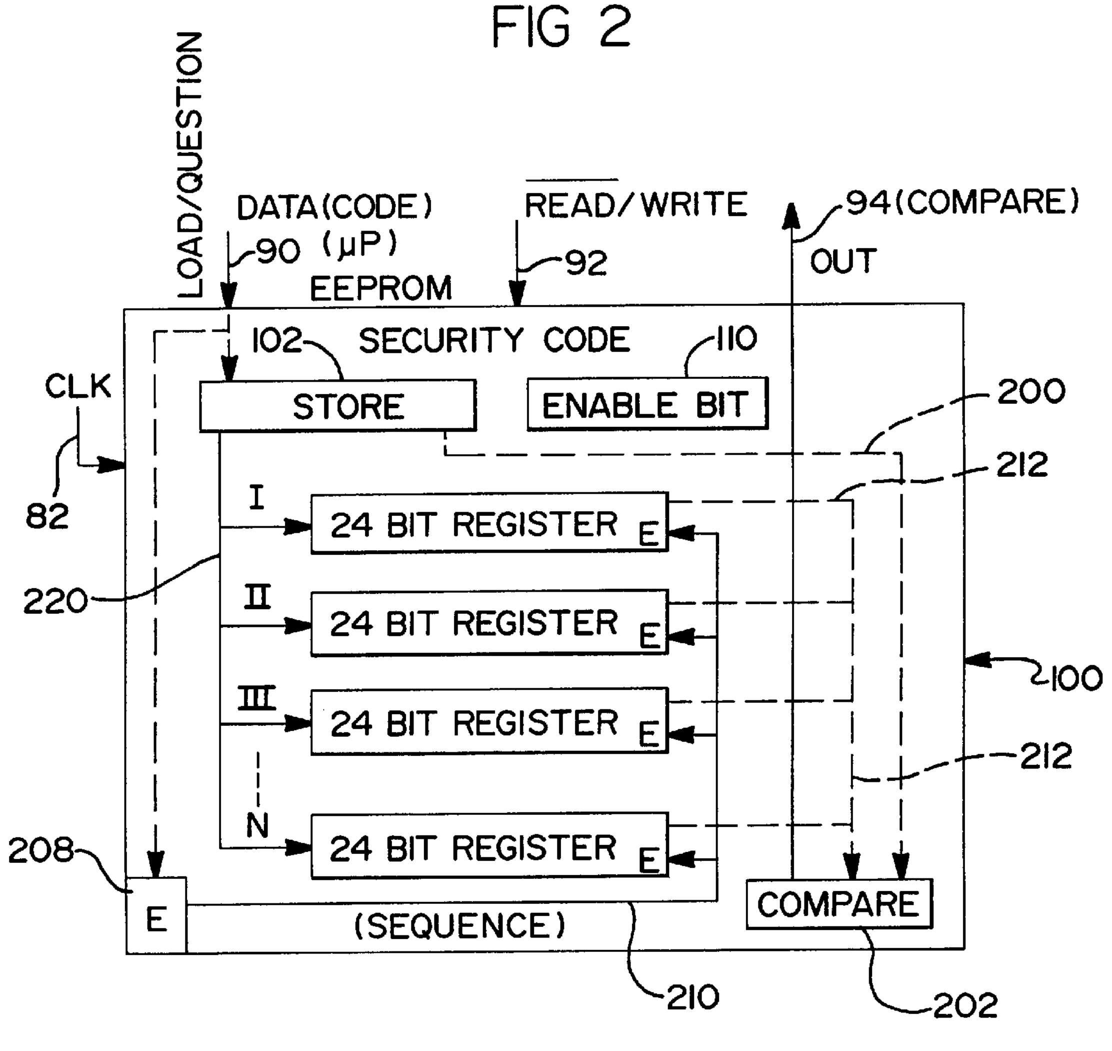
FIG. 2 is an architecture layout of features contained in the custom integrated circuit employed in the receiver unit of the preferred embodiment of the present invention illustrating certain concepts of the EEPROM used in the receiver unit.

In accordance with the present invention, the custom integrated circuit 100 of the receiver includes preprogrammed operating characteristics which are essentially memory locations that can be programmed electrically using standard EEPROM technology. The integrated circuit includes several storage areas for twenty-four bit binary information. FIG. 2 shows these storage areas as registers in an EEPROM. The security codes in these registers are processed by various logic circuits some of which are shown as being contained within the architecture of circuit 100; however, these logic processing components can be located in any IC component of the receiver and even be performed by the program of the microprocessor 80. The logic processing concepts illustrated in the circuit 100 facilitate description of the operation of receiver R as it relates to the stored identification codes in both the READ mode and WRITE mode. Data on bus 90 is controlled by the coded portion of the signal on data line 70; however, it is converted to a binary logic after the logic 1 and logic 0 conditions have been identified and formed with proper calibration. This pure binary data is stored into register 102 of the EEPROM. In the preferred embodiment, logic 1 is greater than 2.4 volts and logic 0 is between 0.0 volts and 0.4 volts. Binary data on bus 90 can be parallel loading or serial loading. This loading occurs any time that a code, recognized as a security code, is received by unit R. Oscillator 82 can be used to clock the received security code into register 102, irrespective of the $\overline{\text{READ}}$/WRITE logic on line 92. After a security code has been received and stored in circuit 100, the stored code is compared with the identification or security codes stored in twenty-four bit registers I, II, III - - - N. Any number of security code registers can be employed in circuit 100; however, in the preferred embodiment, only two registers I, II are provided. The binary logic stored in register 102 is directed, in parallel fashion, through twenty-four data lines, identified jointly as line 200, to a twenty-four bit comparator 202. It is appreciated that the comparator may be programmed into the microprocessor itself or provided hardwired in an IC. Indeed, register 102 could be in the microprocessor itself with the data in registers I–N being transferred to the microprocessor for comparison with an incoming security code. When a code is received from the bus 90, an enable command can be created to sequentially output the logic in registers I, II, III - - - N through schematically illustrated lines 212. If one security code in the twenty-four bit registers matches the code stored in register 102, a compare signal is created in line 94. This signal indicates that the code portion of the received, coded signal S matches logic stored within an area or register of circuit 100.

Circuit 100 is used for two or more twenty-four bit registers I–N, which registers may be changed after enable bit 110 has been set (as will be explained later) and a WRITE signal is created in line 92 by grounding line 84. An erasable PROM allows the storage of identification codes and subsequent field programming. The Executive Program of the microprocessor, which can include much if not all of the data processing functions, is fixed into the PROM of the microprocessor chip 80. Consequently, the comparison network and procedures can be accomplished in either the microprocessor 80 or in a custom IC chip, as schematically indicated generally in FIG. 2. Upon a COMPARE signal appearing in line 94, the particular load driver in driver network 120, shown in FIG. 1, is actuated to energize mechanism B, C or D, according to the switch 12, 14 or 16 which has been closed to create the transmitted function portion of signal S.

Should an identification or security code be loaded into register 102 either in circuit 100 or microprocessor 80 while a WRITE signal is valid at circuit 100, the twenty-four bit registeres I, II, III - - - N will be changed to correspond with the new security code in register 102. As the code transmitted to receiver R remains in register 102 or is stored elsewhere, the enable network 208 simultaneously or in sequence parallel loads the twenty-four bit code from register 102 to the twenty-four bit registers shown in FIG. 2. Loading of the code is illustrated by lines 210, 220 of FIG. 2. Simultaneously loading or sequence loading is controlled by sequencing line 210. A register is loaded upon receipt of a signal at the E terminal by line 208. This loads each of the registers with the received code in register 102. In the preferred embodiment only two twenty-four bit registers are employed; therefore, the first code stored in register 102 when the WRITE signal in line 22 is valid is loaded into both registers I and II. Upon acknowledgement in the microprocessor of a second new code, different from the code stored in register 102, the second new code replaces the first new code in register 102. If this happens before the WRITE signal in line 92 has expired or becomes invalid, the next, new stored code is loaded into all registers subsequent to register I. Consequently, the second new code received during a single WRITE command will be loaded into twenty-four bit register II, twenty-four bit register III, etc. Upon receipt of a third new identification code, the same process is repeated, with the sequence network or control 208 loading the third new code into twenty-four bit register III, and any subsequent registers in circuit 100. This process can continue until all registers are filled with a separate and distinct, new identification code; however, all of this loading procedure, or field programming, must occur during a single WRITE command caused by manually grounding line 84. As will be explained later, the WRITE signal remains for a preselected time, such as 30 seconds. Each of the separate and distinct, new identification codes is obtained by using a different transmitter T, each of which has its own unique and, thus, different identification or security code randomly loaded at the factory making the transmitters. In this manner, the security code or identification code in circuit 100 is loaded by a procedure involving the grounding of line 84 and depression of one of the buttons or switches 12–16 on any transmitter T. This easy procedure causes the first new code to be loaded into all designated areas or registers of circuit 100. A second transmitter T can be actuated by depressing one of the function buttons or switches 12–16 to program a second new code in circuit 100 of receiver R. This second new code is loaded into the register with the next significant level, and all subsequent registers with lower significance. The advantage of using this overwrite logic procedure is that if an unauthorized person, having an easily obtainable transmitter T, desired to surreptitiously record a new transmitter code into someone else's receiver, only one new code will remain in the receiver. Consequently, the authorized transmitter will no longer operate the receiver. If an authorized transmitter does not function, it will be readily apparent that the receiver had been the subject of tampering. By using this scheme, an unauthorized transmitter can not be used to store a code in a subsequent register of circuit 100. All loading occurs during a single WRITE command signal. In practice, the command has a duration of approximately 30 seconds to assure that only authorized transmitters load identification or security codes into the twenty-four bit registers of circuit 100.

Figure 3:
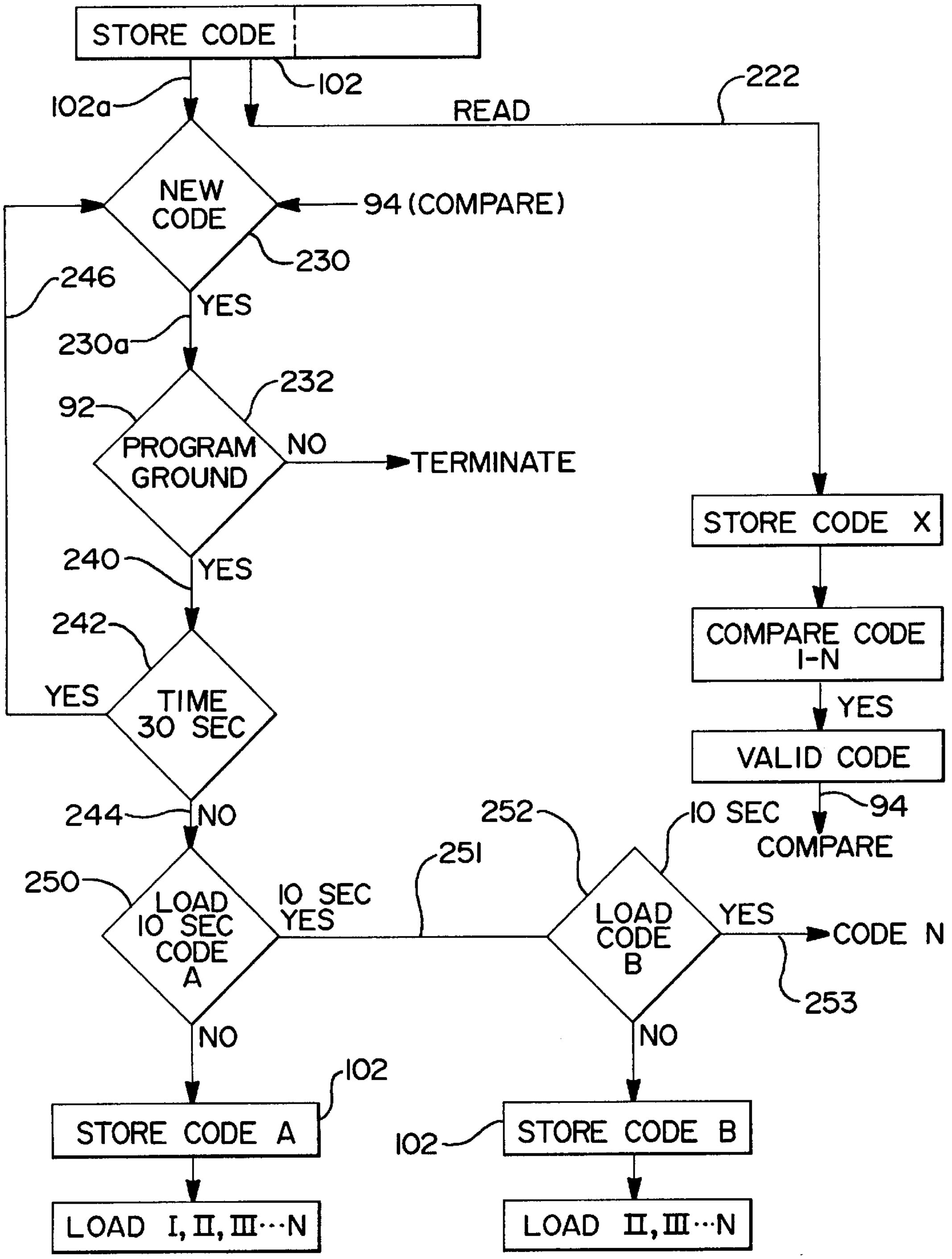
FIG. 3 is a block diagram and flow chart of the system employed by the receiver unit for programming the receiver unit and for operating various control devices in response to an identified incoming coded signal.

The flow chart for field programming of a receiver is laid out in FIG. 3. An acknowledged code is received and stored in register 102, as previously discussed. It is then necessary to determine whether or not this is a new code, by an appropriate circuit 230. This can be done by determining if a COMPARE signal was created in line 94. If this signal is not created, the code in register 102 is new. The code is READ by circuit 100 as indicated by line 222, stored, compared and identified by the logic in line 94. Then the condition of the $\overline{\text{READ}}$/WRITE line 92 is interrogated. If such interrogation, indicated by circuit 232, is negative, the code in register 102 is not valid and the process is terminated. When circuit 232 provides an affirmative response, this response is transmitted in line 240 to a timing stage. This initiates a software timer 232, which in practice has a duration of approximately 30 seconds. As long as this timer stage is not timed out, line 244 is active to initiate the code loading means 250. This stage or circuit loads a first new code which is the first new code stored in register 102 during the time of stage 242. Code loading means 250 has a first stage that is enabled for a time, such as 10.0 seconds. A second stage of loading means 250 is identified as circuit or stage 252 and is also enabled for a given time, such as 10.0 seconds. The given time of the second stage 252 is initiated upon a loading affirmed signal in line 251 from the first stage of code loading means 250. Within the second ten seconds stage, a second new code, i.e. code B, can be stored in register 102 and then loaded into all registers I–N, except register I. This procedure can be repeated for at least one additional stage as indicated by line 253. This next stage lasts for a time, such as 10.0 seconds, after code B is loaded into the registers subsequent to register I. Should more registers be employed, timer 242 would be increased by approximately ten seconds for each additional code to be loaded into a register available in circuit 100. It is appreciated that the twenty-four bit registers I–N are really only storage areas of a EEPROM memory and need not be constructed in any particular architecture. As soon as timer 242 times out, line 246 resets circuit 230 for preventing programming until circuit 232 and timer 242 are again activated. In this manner, an unauthorized person can not write into the lower registers of circuit 100 at some later time; however, sufficient time is available for field programming of receiver R by two or more authorized transmitters.

Whenever a signal is received by antenna 61, power is maintained for 4.0 seconds on the line 66. If a shorter time is created by circuit 64, a second circuit holds the power until field programming can be accomplished, i.e. at least 30 seconds or power is maintained as long as line 84 is grounded.

In FIG. 3A, there is a schematically illustrated scheme for comparing a new code in register 102 to existing codes in registers I–N as called up by line 222 of FIG. 3. The code is first compared to stored code A. If there is a match, a valid command is created in line 94. This procedure progresses from code A to code B, etc., through all registers in circuit 100. FIG. 3B illustrates a schematic circuit concept for accomplishing the time delay discussed in connection with timer or timing program 242 started upon identification of a new incoming code. When the field programming switch 86 is closed, line 84 is grounded as previously discussed. This can actuate a one shot multivibrator 242' set at approximately 30 seconds. Consequently, a logic 1 WRITE signal is created for thirty seconds in line 92. A new code received during this time initiates line 230*a,* illustrated in FIG. 3, which initiation signal is combined with the WRITE signal by AND gate 248 for the purpose of enabling the network E, i.e. circuit 208 of FIG. 2. This network, under the Executive Program of the microprocessor, loads the twenty-four bit registers in circuit 100 as discussed in detail earlier.

FIG. 3C is an architecture that can be used to correlate loading of successive new codes A and B during field programming. During the first stage of the code loading means 250, the inputs of gate 249 are line 249*a,* existence of the code A, and line 249*b,* the ten second window from the first stage of loading means 250. This logic is combined by AND gate 249 for loading all registers by enabling lines 220 I–N. When the time of the first stage expires, flip-flop 254 is toggled to initiate the second time stage 252 for the purpose of recording code B in all registers after register I. As can be seen, in the scheme so far described in FIG. 3C, if a transmitter is not actuated during the first stage, code A will be loaded into subsequent registers leaving register I with a prior code. To prevent this from happening, D terminal flip-flop 252 is connected to the output of AND gate 249. Unless all registers are loaded during the first stage, subsequent stages can not be loaded. Other arrangements could be employed for accomplishing the field programming of the preferred embodiment of the present invention. The circuitry illustrated in FIGS. 2, 3A, 3B, 3C are illustrative architecture to teach the inventive concepts.

Various arrangements can be employed for identifying the function portion of signal S that operates drivers 120 in accordance with the depressed switch 12–16 of transmitter T. FIG. 4 illustrates schematically an arrangement in receiver R for accomplishing this purpose. When an incoming code is loaded in register 102, the logic in line 102*a* (FIG. 3) is combined with a valid COMPARE signal in line 94 to toggle flip-flop 60. When initiation circuit 64 expires, register 102 is reset and the logic in line 102*a* is shifted to a logic, such as logic 0. This enables a decoder 270 for transferring the logic bits stored in function register 262 to the input lines of load drivers 120 for operating the logic on lines 122, 124 and 126. An enable signal in line 264, upon receipt of a coded signal, loads the function portion of the signal into register 262 for decoding by decoder 270. All of this logic is performed by the Executive Program stored in microprocessor system 80. Of course, other arrangements could be employed for identifying and outputting the proper function upon identification of the proper security code in the code portion of a received coded signal S.

Figure 5B:
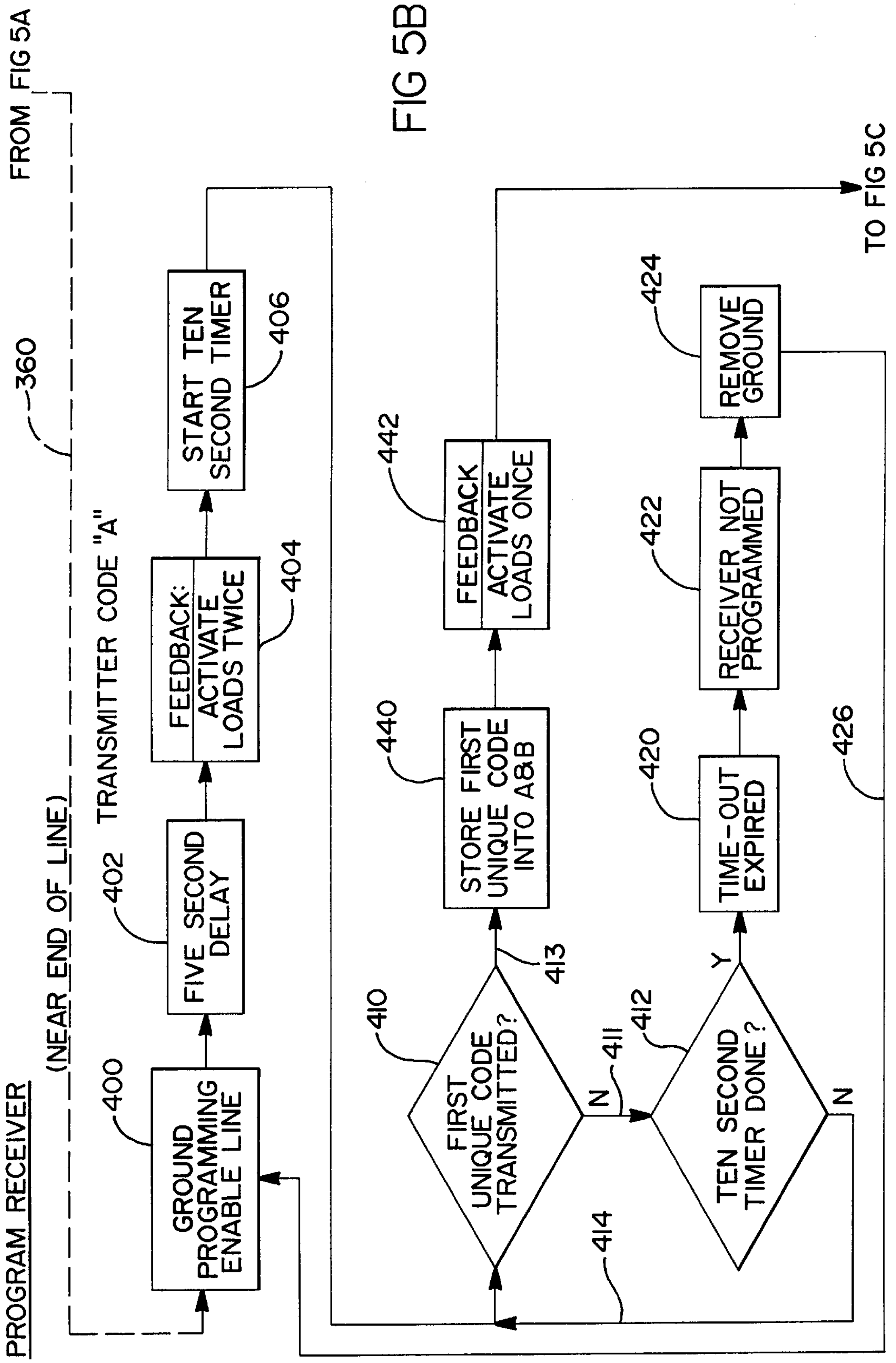
FIG. 5 is a flow diagram, divided into views 5A, 5B and 5C, illustrating the preferred embodiment of the present invention as it is used in the manufacturing plant and ultimately field programmed.
Figure 5C:
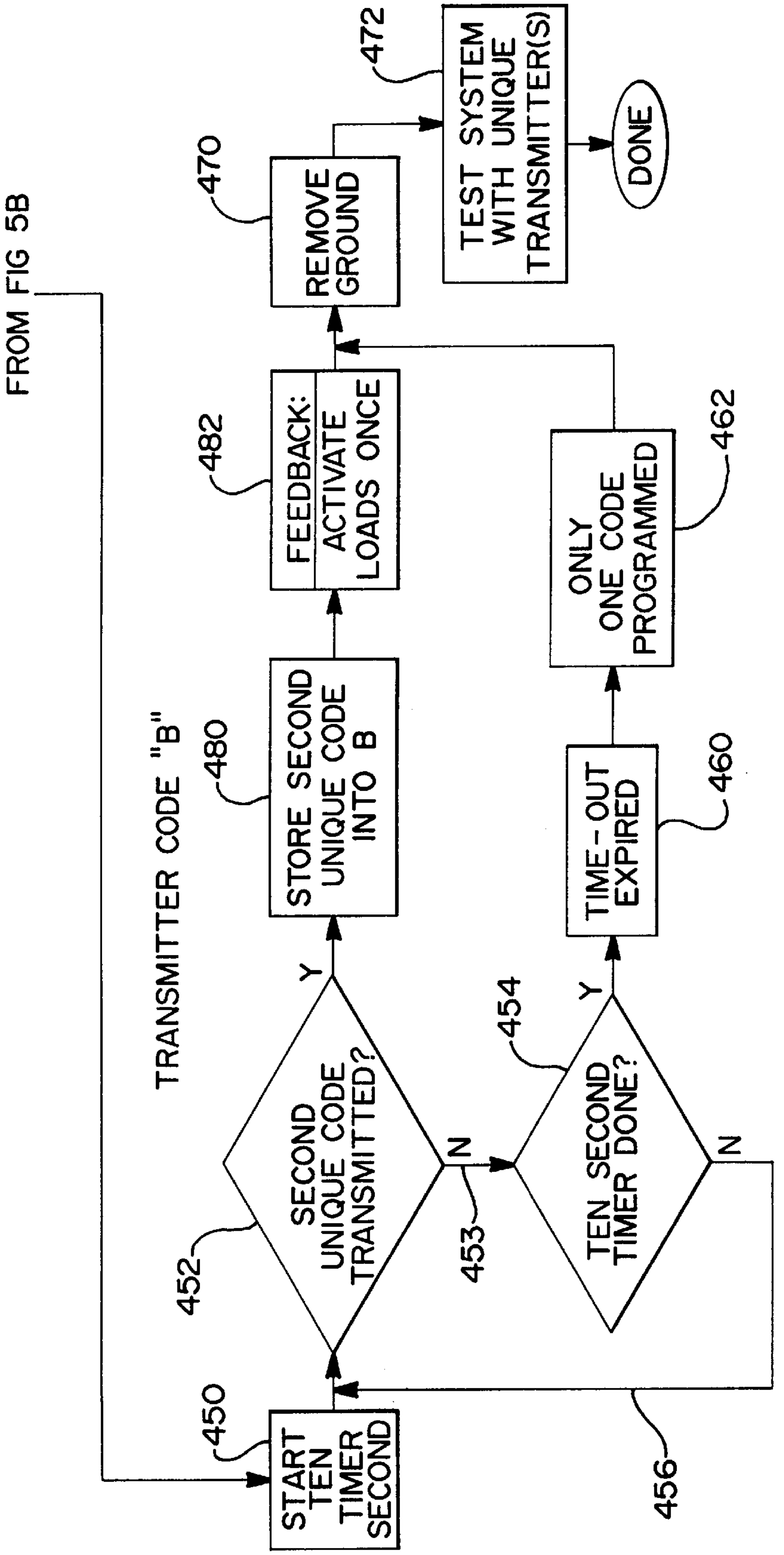

The flow diagram of FIG. 5, divided into sections 5A, 5B and 5C, illustrates the concept of the present invention from assembling receiver R into a motor vehicle at a factory and programming the receiver at the dealer or later by any transmitter T having an unknown, but unique identification or security code loaded therein. Progression through this flow diagram will describe the function of the invention, together with several advantages obtained by using the invention, as so far described in connection with FIGS. 1–4.

Receivers R are loaded with a specific universal code in all registers of circuit 100 and are then shipped to the automobile manufacturer. At the assembly line, indicated to be the "trim area", a receiver is installed at an appropriate location within a vehicle. See block 300. A special control transmitter Tc contains the special universal code "T" in its code register 40. When transmitter Tc is actuated at the trim area, by closing one of the switches 12–16, as indicated by block 302 the door locks or trunk latch can be tested. Activation of the door locks and latch indicates that the receiver being tested is operating properly. This test is done by transmitter unit Tc. Should the function test, indicated by block 302, be successful, a worker on the assembly line then grounds enable line 84 by closing switch 86 or otherwise, as indicated by block 304. There is then a five second delay which is processed by microprocessor 80 and indicated by block 306. To indicate that the enable line is actuated, the microprocessor of the receiver operates the door locks, as indicated by block 308. This sets the programming timer 242 awaiting loading of a new code from register 102 to registers I–N, as shown in FIG. 2. This concept is best described in connection with FIG. 3B. Then the worker actuates standard transmitter Tc adjacent the assembled receiver R as shown by block 310. As long as a signal from transmitter Tc has not been received, an output remains in line 312 and no signal is given in line 313. If the thirty seconds of time 242 has not expired, the output 322 of block 320 is negative indicating the system is still awaiting actuation of the standard transmitter Tc. Consequently, there is a waiting loop which is held for thirty seconds awaiting receipt of a code T. If there is no such signal received for the loop time, i.e. 80 seconds, the timer expires as indicated by block 330. The program enabling bit 110 of circuit 100 is not set, as indicated by block 332. To set the essential bit, the operator or worker must remove the ground of line 84 and start the process over from block 304 as indicated by line 346. Of course, if grounding of the enable line actuates one shot 242' as indicated in FIG. 3B, the ground is removed automatically upon expiration of the one shot thirty seconds. This function is indicated by block 340 to represent a condition when a code T has not been received during the lapsed time of the field programming timer 242. With either concept, the operator or workman must recycle the factory enabling step by again grounding line 84. Various arrangements can be used for grounding line 84 to create a WRITE signal at circuit 100 of the installed receiver R. This enabling step assures that the universal code is in the receiver until the desire to reprogram the unit; consequently, testing at block 302 can be done with Transmitter Tc.

Assuming that during the time loop, indicated between lines 312 and 322, there is a received and acknowledged code T at the receiver, enable bit 110 is then set as indicated by line 313 actuating block 350. The microprocessor, when the receiver is enabled, again cycles the door locks to indicate that enable bit 110 has been set. This function is indicated by block 352. The ground on line 84 is removed as indicated by block 354. If this release of the ground has not been done by a positive step or by expiration of one shot 242', there is a processing loop indicated by line 356 and block 358. As soon as the ground has been removed, receiver R is properly conditioned for field programming and remains with the vehicle as it progresses through the assembly line and is delivered. The vehicle is then shipped to a dealer where a transmitter T is supplied to the customer with the vehicle. This completion of factory involvement in use of the invention is indicated by the dashed line 360 from FIG. 5A to FIG. B.

To program the twenty-four bit registers I–N in circuit 100 of the assembled and fixedly mounted receiver R for the first time and after the vehicle is delivered, line 84 is again grounded. This is indicated by block 400 in FIG. 5B. After a five second delay, indicated by block 402 the door locks are cycled as indicated by block 404. This shows to the field programmer that programming is awaited. The first stage of code loading means 250 is initiated, as indicated by block 406. After code loading means 250 has been actuated, any one of the randomly coded transmitters T can be used to program code "A" into the receiver. By depressing any switch 12–16 of a randomly selected transmitter T, a first unique code is transmitted as the coded portion of signal S received by receiver R. This signal receipt is indicated by the affirmative output of block 410. As long as there is no unique code identified by the receiver after line 84 is grounded, the negative output 411 of block 410 cycles through block 412 and line 414 until a time of 10 seconds has expired. When that occurs, as indicated by block 420, the receiver has not been programmed, as indicated by 422, and the ground on line 84 is removed, as indicated by block 424. This recycles the field programming function back to block 400, as indicated by line 426. Programming can only be done by reestablishing a ground on line 84. Receiver R retains its original code T and will not be operated by any transmitter except transmitter Tc. Programming efforts are then repeated until an affirmative output is created at line 413 from block 410. This signal or output indicates that a unique code (code "A") of the randomly selected transmitter has been received. The code "A" is loaded or stored into both registers I and II as indicated in block 440. Registers I and II are labled A and B to correspond with codes "A" and "B". When a first code has been programmed into the registers A, B (I, II) microprocessor 80 again activates the door locks as indicated by block 442. This signal arrangement is accompanied by initiation of the second stage 252 of the code loading means 250, as indicated by block 450 in FIG. 5C. The microprocessor then determines whether or not there is within the second time period, a second new transmitted code (code "B") from a second randomly selected transmitter. There is no need for a second code; however, some user needs two or more transmitters to operate a single receiver of a vehicle. Block 452 has a negative output 453 as long as a second new code (code "B") is not received. This causes a loop cycle during the second timer means (252 of FIG. 3), as indicated by block 454 and line 456. If there is no second code received during the second timer period, the second timer expires as indicated by block 460. In this case, only one code (code "A") has been programmed into the receiver, as indicated by block 462, which is followed by a removal of the ground on line 84, as indicated by block 470. Thereafter, the first transmitter is used to actuate the door locks and the trunk latch by depressing buttons 12, 14 and 16 in sequence. This is a testing function indicated by block 472. If there has been a second receive code (code "B"), then the second code is stored in register B (I), as indicated by block 480. When that second programming occurs, the microprocessor 80 actuates the door locks again, as indicated by block 482. Then the ground on line 84 is removed. Blocks 470, 472 are cycled.

When a new transmitter is used to reprogram the receiver of system A, the new code of the new transmitter is loaded into all twenty-four bit registers of circuit 100. This erases any previous identification code or security code within the registers. Consequently, unauthorized reprogramming will negate the functioning of the original transmitter or transmitters. In this fashion, reprogram is detected at once and can be corrected by immediately changing the program back to the original codes "A" and/or "B", using the original transmitter or transmitters. Should a transmitter be lost, it is only necessary to purchase a new transmitter and then reprogram the receiver in the field. At no time is it necessary to buy, re-adjust manually or repair a receiver which is fixedly mounted in a vehicle.

FIG. 6 is a schematic view illustrating the concept of creating the load release signal in line 500 to set enable bit 110 of the EEPROM. This is accomplished by grounding line 84 through switch 86, as previously described. At the same time, the T code is transmitted and loaded into register 102 where it is compared to the registers and produces a signal in line 94. This is the second input to AND gate 502 which has an inverted input 504 from switch 86. This drawing is schematic in nature and is used to illustrate operation of the invention upon receipt of the code T at the same time that line 84 is grounded or during a held time, as represented by one shot 242'. This occurs at block 304 of FIG. 5A. The enable bit 110 of circuit 100 is set by a command in line 500. In this manner, the receiver in the vehicle is permanently released for field programming. The bit 110 is released or set at the facility manufacturing the receivers for the purpose of initial loading of the T code into all registers of circuit 100. Thereafter, bit 110 is reset to lock code T in receivers at the factory to facilitate field programming by a randomly selected transmitter.

Figure 11:
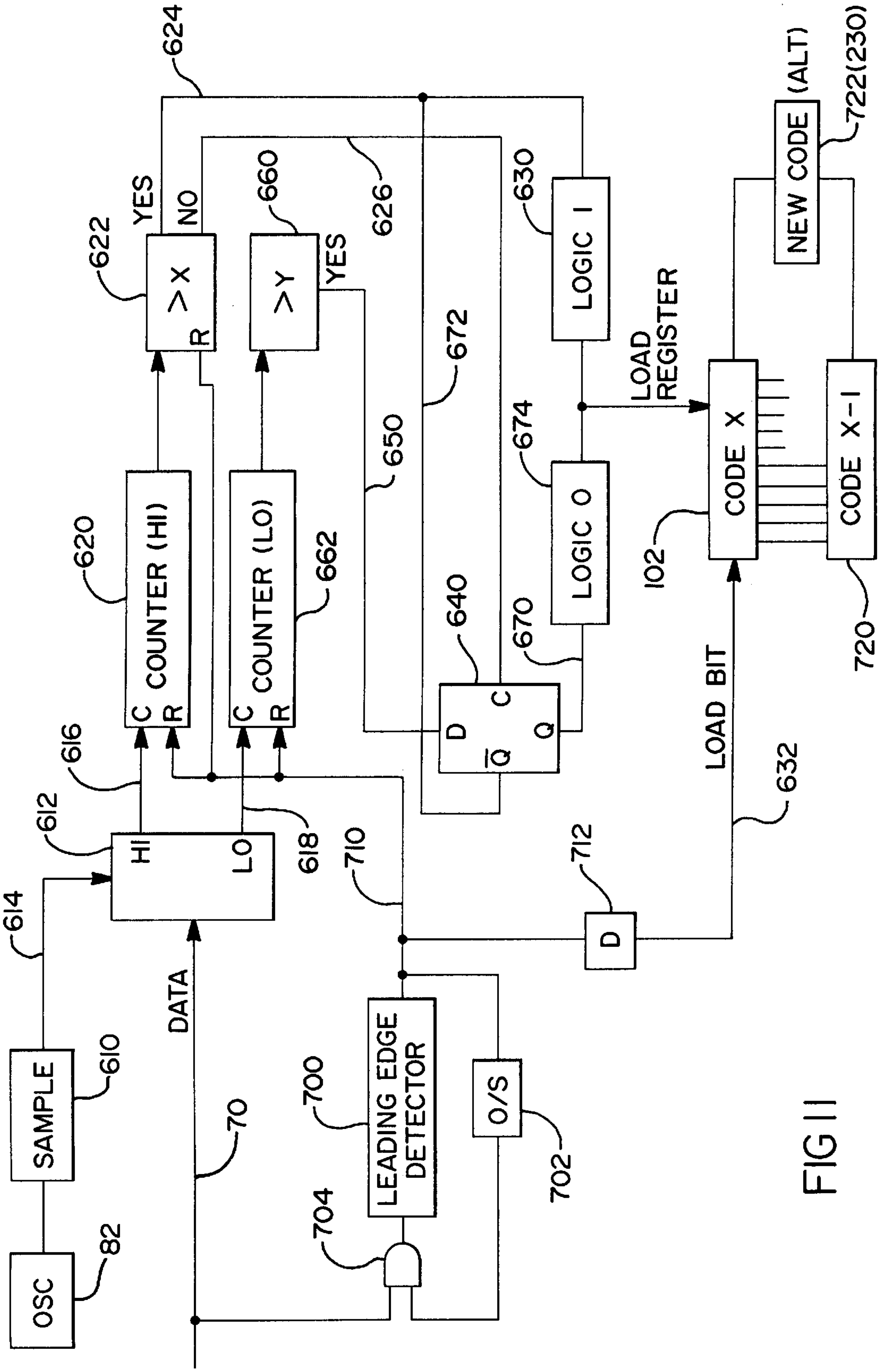
FIG. 11 is a diagram of the logic circuit employed in detecting the binary state of the coded signal during each window or bit of the incoming received coded signal.

FIGS. 7–13 illustrate a further aspect of the invention wherein a particular type of binary code is employed for the transmitted signal S. In addition, there is provided a unique arrangement for calibrating the operation of the receiver so that microprocessor 80 driven by block 82 will be locked onto the output characteristics of microprocessor 10 driven by oscillator 32, without a need for the two oscillators to be matched and/or crystal controlled. FIG. 7 is a simplified view of the system shown in FIG. 1 illustrating only those items needed to consider the signal processing aspect of the invention. In FIGS. 8 and 9 the pulse length W is a "window" for each bit of data in the transmitted signal on a high frequency carrier. The initiation portion of the signal S includes a constant logic 1 with a duration of at least two windows. As soon as this signal is received by detector 60, microprocessor 80 is initiated and awaits the following portion of the coded signal S which is communicated in binary language through data bus 70 from detector 60 to microprocessor 80. In accordance with one aspect of the invention, the binary number on each bit or window is represented by a duty cycle, i.e. as a percentage of the bit or window length. The window length or bit length is the distance between two adjacent positive going, leading edges of signal S. The logic 1 in signal S is a duty cycle indicated to be 80% of the width of the window. In a like manner, the logic 0 has a duty cycle of 20% of the window. By using positive going pulses for both logic 1 and logic 0, they are more easily detectable and easily processed by the receiver. The procedure for processing the incoming received security code portion of signal S is illustrated in FIGS. 10 and 11. In accordance with the illustrated embodiment of the invention, sampling pulses 600 are created simultaneously with the incoming logic on data bus 70. The number of sampling pulses is selected to represent a given relationship in the bit length or window W. In practice this is about 30 sampling pulses during each window W. These sample pulses or signals are created by a sampling pulse forming circuit 610 driven by oscillator 82. Circuit 610 involves a divider circuit for the output of oscillator 82 to create approximately 30 sampling pulses 600 during a window W. A level sensor circuit 612 is clocked by the output 614 of the sampling pulse creating circuit 610. During each sample pulse 600, a logic 1 appears in output 616 or output 618, in accordance with whether or not data line 70 is at a high level or a low level, respectively. The sampling pulses appear in output 616 when the data is high. These sample pulses are counted by counter 620. The count of counter 620 is compared to a set upper limit X by circuit 622. If the accumulated count exceeds X, a logic 1 appears in line 624. If at the end of the window or bit, counter 620 does not exceed X, circuit 622 is reset and a logic 1 appears in line 626. Assume that line 624 does shift to a logic 1, circuit 630 will load a logic 1 into register 102 upon receipt of a load signal in line 632. Should a logic 1 appear in line 626, and a logic 0 in line 624, when circuit 622 is reset the state of the bit may be questionable in some highly unusual circumstances. Thus, a signal in line 626 is not interpreted as a logic 0 in the window W. Thus, further circuitry is employed to determine whether or not a logic 0 should be set into the register 102. This additional circuitry is employed to be certain of the logic to load into each bit of register 102.

FIG. 11 shows an arrangement for determining whether or not the borderline case when counter 620 does not reach X is a logic 0 or a logic 1. This is accomplished by using an appropriate circuit, such as a D-type flip-flop 640 which is clocked upon receipt of a logic 1 in line 626. The D terminal of the flip-flop is connected to the output 650 of limit detector circuit 660. The limit of this circuit is set to a number Y substantially corresponding to ⅓ of a window in the preferred embodiment. Counter 662 counts sampling pulses occurring while data line 70 is at a low level. If the count in counter 662 exceeds the number Y then the bit in the window W is a logic 0. A logic 1 appears in line 650, so that a logic 1 in line 626 clocks flip-flop 640 to apply a logic 1 at the Q output 670 and a logic 0 at the $\overline{Q}$ output 672. This causes a logic 1 to appear in the "logic 0" circuit 674 and deactivates the "logic 1" circuit 630; therefore, a "load bit" signal in line 632 loads a logic 0 into the code register 102.

To determine the length of window W, i.e. the bit length of Signal S, the circuit illustrated in FIG. 11 includes a leading edge detector 700. One-shot 702 disables input gate 704 of detector 700 so that spurious leading edges, such as spikes, will not be detected. The one-shot is set to a time which is a relatively high percentage of the anticipated sampling pulses during a window W. In this manner, leading edge detection occurs only on the positive going portion of data on line 70. This will read the binary logic during each of the successive windows W in the 24 bits forming an identification or security code. Output 710 resets counters 620, 662 and resets set limit circuit 622 this output creates the "load bit" signal in line 632 through a short time delay network or circuit 712. By using the delay, a digit of register 102 is loaded for each window or bit immediately after the binary logic of the window has been determined in an appropriate manner as suggested by the circuit in FIG. 11. In operation, counter 620 counts until a logic 1 appears on line 624 if the bit is a logic 1. This logic loads circuit 630 and, thus, applies a logic 1 at the bit location in register 102. Upon the next leading edge indicating the end of a window W, a "load bit" signal in line 632 shifts the logic 1 from circuit 630 into the first location of register 102. Should a logic 1 not appear in line 624, then counter 662 is relied upon to count the sample pulses during low level of the data on line 70. If this count exceeds Y, a logic 1 appears in line 650 indicating that the binary logic for the existing window W is a logic 0. This applies a logic 1 to the D terminal of flip-flop 640 so that upon reset of circuit 622 a logic 1 is clocked into circuit 674 into the Q output 670 of flip-flop 640. This applies a logic 1 in "logic 0" circuit 674. Immediately thereafter a "loadbit" signal in line 632 loads a logic 0 into the next bit position of register 102. After this loading has been accomplished for all bits in register 102, the content of this register is compared to the previous coded signal received by the receiver which is contained in register 720. If there is not a comparison, then a "new" code is recognized by comparator circuit 722 which generally corresponds with lock 230 in FIG. 3. This is an alternate arrangement for identifying a "new" code and can be used. Of course, after a code is received, a timer can be used to empty register 102 so that any next code will be loaded in the register. By using the circuit shown in FIG. 11 there is a positive identification of the duty cycle type data on bus 70 to protect against improper detection of transmitted codes. This concept provides a positive response by a receiver R, which adds to commercial acceptance of the system constructed in accordance with the present invention.

Referring now to FIGS. 12 and 13, another aspect of the present invention is illustrated wherein the receiver R is provided with an arrangement for matching the response detected by use of oscillator 82 with the transmitted logic determined by the oscillator 32. To accomplish this calibration concept, the average width of the windows W, as detected by sample pulses 600 appearing in line 614, is determined. The average can be accomplished by a circuit illustrated in FIG. 13, wherein leading edge detector 700 produces a pulse in line 710 whenever a positive going leading edge is detected. Counter 800 counts the sampling pulses 600 during a given number of windows W, which in the illustrated embodiment is 24. Circuit 802 produces an output in line 804 when the 24 windows have been counted. Of course, the one shot 702, shown in FIG. 11, could be used to remove most noise or spike in the incoming binary data. A signal in line 804 loads register 810 with the count from counter 800. Immediately thereafter delay circuit 812 resets counter 800 for the purpose of repeating the counting function. A dividing circuit 820 divides the accumulated count in register 810 to produce an average count for each window W. Two-thirds of this count is loaded into set limit circuit 622 of FIG. 11 to detect a logic 1. This number represents the count X of circuit 622. One-third of the average count in circuit 820 is loaded as the number Y of number limit circuit 660. By utilizing this concept, the windows W are set to the transmitted window W of signal S. Other arrangements could be employed for accomplishing this same purpose; however, the particular binary coding scheme employed in accordance with the present invention facilitates this type of receiver calibration.

The present invention is basically described in connection with FIG. 5 and the remaining circuits and flow diagrams are used to explain how this type of system can be constructed and is constructed in practice by using easily available principles. In practice certain other features and characteristics of system A have been developed. Signal S has used a 64 bit receiver wake-up signal followed by a customer identification code. This would allow each transmitter to be useful for a given producer of vehicles, but not for all vehicles employing a receiver as defined herein. A synchronizing pattern can be sent on signal S such as a high logic for 15% of a bit and then a low logic for 3.85 bits. This 4 bit portion synchronizes the receiver with the data to be thereafter transmitted on signal S. In practice, the function code is 8 bits with a given sequence selecting the device to be operated. Thus, by holding the unlock switch, all doors can be unlocked while a depression of this switch unlocks only the driver door.

Referring again to FIGS. 2 and 6, enable bit 110 is employed so that receivers R can not be used unless a transmitter with a T code is available. Consequently, should the receivers be lost or displaced before assembled into a vehicle and subjected to a signal having a selected T code, the receivers would be of no commercial value.

Although there are several operating procedures for designating which function is performed by load drivers 120, other concepts could be employed. For instance switch 14, as explained, can be used to unlock only the driver's door or all doors. In practice a single actuation performs the former function, whereas two or more actuations of switch 14, within a final window will unlock all doors. This same procedure could be used for other switches to increase the capacity of the system without increasing the number of switches.

Having thus described the invention, it is claimed:

1. Apparatus operative to control access to a vehicle, said apparatus adapted to be mounted on said vehicle and to respond to remote hand-held portable transmitters, each transmitter of which transmits coded signals distinctive from the coded signals transmitted by other said transmitters, and wherein the apparatus is programmable in the field to recognize the coded signals transmitted from authorized said transmitters and not from unauthorized said transmitters so as to permit access to said vehicle in response to receipt of coded signals from said authorized transmitters, said apparatus comprising:

receiver means for receiving coded signals transmitted by said transmitters;

memory means for storing information for identifying the distinctive coded signals received from said authorized transmitters, said memory means being capable of storing at any time information sufficient to identify the coded signals transmitted from at least two different said transmitters;

means manually operable in the field for initiating programming periods; and, computer means responsive to said receiver means and said memory means (a) for causing said information stored in said memory means to represent only those said transmitters that transmitted coded signals to said apparatus during the most recent said programming period, and (b) for evaluating coded signals received during non-programming periods in accordance with said stored information and allowing control of access to said vehicle in response to said coded signals only if the transmitter that generated said coded signal also transmitted a coded signal to said apparatus in the most recent said programming period;

whereby programming of said apparatus with an unauthorized said transmitter during the most recent said programming period will be apparent to the vehicle operator because said authorized transmitters that were programmed during a programming period prior to the most recent said programming period will not be capable of controlling access to said vehicle after said most recent said programming period.

2. Apparatus operative to control functions of a vehicle, said apparatus adapted to be mounted on said vehicle and to respond to remote hand-held portable transmitters, each transmitter of which transmits coded signals distinctive from the coded signals transmitted by other said transmitters, and wherein the apparatus is programmable in the field to recognize the coded signals transmitted from authorized said transmitters and not from unauthorized said transmitters so as to permit control of said vehicle in response to receipt of coded signals from said authorized transmitters, said apparatus comprising:

receiver means for receiving coded signals transmitted by said transmitters;

memory means for storing information representing authorized transmitters, said memory means being capable of storing at any time information representing at least two different said transmitters;

means manually operable in the field for initiating programming periods; and computer means responsive to said receiver means and said memory means (a) for causing said memory means to store information representing only those said transmitters from which coded signals were received during the most recent said programming period, and (b) for evaluating coded signals received during non-programming periods in accordance with said stored information and allowing control of said vehicle in response to said coded signals only if the transmitter that generated said coded signal also transmitted a coded signal to said apparatus in the most recent said programming period;

whereby programming of said apparatus with an unauthorized said transmitter during the most recent said programming period will be discernible to the vehicle operator because said authorized transmitters that were programmed during a programming period prior to the most recent said programming period will no longer be capable of controlling said vehicle after said most recent said programming period.

3. Apparatus operative to control functions in a vehicle, said apparatus adapted to be mounted on said vehicle and to respond to coded signals received from only authorized ones of a number of remote hand-held portable transmitters and not from unauthorized said transmitters functioning in the field, said apparatus comprising:

means manually operable from time to time in the field for initiating field programming periods;

means for automatically causing said apparatus to recognize as valid only those transmitters from whom coded signals were received during the most recent programming period and not to recognize as valid any other transmitters, said means being capable of recognizing as valid at least two different transmitters at any given time; and control means for controlling said vehicle functions only in response to coded signals received from valid transmitters;

whereby programming of said apparatus with an unauthorized said transmitter during the most recent programming period will be noticeable to the vehicle owner because transmitters that were programmed before the most recent said programming period will not control vehicle functions after said most recent said programming period.

4. In a secure remote control system for door locks including a receiver programmable to recognize at least two different portable transmitters from the coded signals transmitted by said transmitters, a method of programming said receiver from time to time in the field and of operating said receiver thereafter, comprising the steps of:

placing the receiver into a field programming mode in response to a user request to initiate field programming;

receiving the coded signals from each portable transmitter operated by the user during the field programming mode;

retaining in said receiver information sufficient to permit the receiver to recognize coded signals subsequently transmitted from the same said transmitters that were operated during the field programming mode;

returning the receiver to normal operation after the field programming mode is finished; and operating said receiver thereafter in accordance with the retained information so that the receiver automatically operates the door locks only in response to coded signals received from transmitters that were operated by the user during the most recent field programming mode and not in response to coded signals received from any other transmitters.

* * * * *